United States Patent
Shin et al.

(10) Patent No.: US 12,541,997 B2
(45) Date of Patent: Feb. 3, 2026

(54) TRAINING SYSTEM AND DATA COLLECTION DEVICE

(71) Applicant: SONY GROUP CORPORATION, Tokyo (JP)

(72) Inventors: Andrew Shin, Tokyo (JP); Yoshiyuki Kobayashi, Tokyo (JP); Kenji Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 537 days.

(21) Appl. No.: 17/906,761

(22) PCT Filed: Mar. 24, 2021

(86) PCT No.: PCT/JP2021/012368
§ 371 (c)(1),
(2) Date: Sep. 20, 2022

(87) PCT Pub. No.: WO2021/200503
PCT Pub. Date: Oct. 7, 2021

(65) Prior Publication Data
US 2023/0360437 A1    Nov. 9, 2023

(30) Foreign Application Priority Data
Mar. 31, 2020 (JP) ................. 2020-065069
Jul. 13, 2020 (JP) ................. 2020-120049

(51) Int. Cl.
*G06T 7/00*    (2017.01)
*G06F 3/01*    (2006.01)
(Continued)

(52) U.S. Cl.
CPC ............ *G06V 40/176* (2022.01); *G06F 3/015* (2013.01); *G06T 7/10* (2017.01);
(Continued)

(58) Field of Classification Search
CPC ...... G06V 40/176; G06V 10/82; G06V 20/70; G06F 3/015; G06F 2203/011;
(Continued)

(56) References Cited

U.S. PATENT DOCUMENTS 6,092,017 A * 7/2000 Ishida ................. F02D 41/1404
706/2
2018/0329994 A1* 11/2018 Xie ......................... G06Q 30/02
(Continued)

FOREIGN PATENT DOCUMENTS

JP    11-085719 A    3/1999
JP    2008269065 A    11/2008
(Continued)

OTHER PUBLICATIONS

International Search Report and Written Opinion of PCT Application No. PCT/JP2021/012368, issued on Jun. 29, 2021, 13 pages of ISRWO.

(Continued)

*Primary Examiner* — Van D Huynh
(74) *Attorney, Agent, or Firm* — CHIP LAW GROUP

(57) ABSTRACT

Provided is a training system that performs training of a machine learning model that generates an impressing content or estimates a camera operation for capturing an impressing content. The training system includes a data collection device that collects data, and a training device that performs training of a machine learning model by using the data collected by the data collection device, in which the training device performs re-training of the machine learning model by using learning data that affects the training of the machine learning model to a predetermined degree or more, insufficient learning data, or data similar thereto, collected on the basis of a result of analyzing learning data that affects the training of the machine learning model.

10 Claims, 19 Drawing Sheets

(51) Int. Cl.
*G06T 7/10* (2017.01)
*G06V 40/16* (2022.01)

(52) U.S. Cl.
CPC .................. *G06F 2203/011* (2013.01); *G06T 2207/20081* (2013.01); *G06T 2207/20084* (2013.01)

(58) Field of Classification Search
CPC . G06F 3/012; G06T 7/10; G06T 2207/20081; G06T 2207/20084; G10L 15/10; G06N 3/02; G06N 3/08; G06N 20/00; H04N 21/258; A61B 5/16
See application file for complete search history.

(56) References Cited

U.S. PATENT DOCUMENTS

| | | | | |
|---|---|---|---|---|
| 2019/0174109 | A1* | 6/2019 | Yoshikawa | H04N 13/243 |
| 2020/0074156 | A1* | 3/2020 | Janumpally | G06V 40/173 |
| 2020/0327709 | A1* | 10/2020 | Liu | G06V 10/82 |
| 2021/0226939 | A1* | 7/2021 | Patel | G06F 21/32 |

FOREIGN PATENT DOCUMENTS

| | | |
|---|---|---|
| JP | 2009111938 A | 5/2009 |
| JP | 2010093584 A | 4/2010 |
| JP | 2012160082 A | 8/2012 |
| JP | 2018-149669 A | 9/2018 |
| WO | 2018/030206 A1 | 2/2018 |
| WO | WO-2019215778 A1 | 11/2019 |

OTHER PUBLICATIONS

Gu, et al., "Using Brain Data for Sentiment Analysis", Journal for Language Technology and Computational Linguistics (JLCL) 2014—Band 29 (1), Aug. 2014, pp. 79-94.

Yang, et al., "Music Emotion Classification: A Fuzzy Approach", Proceedings of the 14th ACM International Conference on Multimedia, Oct. 23-27, 2006, pp. 81-84.

Li, et al., "Visual Social Relationship Recognition", Computer Vision and Pattern Recognition, Dec. 13, 2018, 15 pages.

Koh, et al., "Understanding Black-box Predictions via Influence Functions", Proceedings of the 34th International Conference on Machine Learning, Australia, Dec. 29, 2020, 12 pages.

Kendall, et al., "What Uncertainties Do We Need in Bayesian Deep Learning for Computer Vision?", 31st Conference on Neural Information Processing Systems (NIPS 2017), USA, Oct. 5, 2017, 12 pages.

Yokoi, et al., "A Study of Business Interpretation Technique for AI Predictions", Institute of Electronics, Information and Communication Engineers (IEICE) Technical Report, vol. 118, No. 513, Mar. 10, 2019, pp. 61-66.

Light; "High-speed image recognition solutions using deep learning techniques", Monthly Automatic Recognition, Mar. 2020, vol. 33, No. 3, pp. 33-38, ISSN: 0915-1060.

* cited by examiner

TRAINING SYSTEM AND DATA COLLECTION DEVICE

CROSS REFERENCE TO RELATED APPLICATIONS

This application is a U.S. National Phase of International Patent Application No. PCT/JP2021/012368 filed on Mar. 24, 2021, which claims priority benefit of Japanese Patent Application No. JP 2020-065069 filed in the Japan Patent Office on Mar. 31, 2020, which claims priority benefit of Japanese Patent Application No. JP 2020-120049 filed in the Japan Patent Office on Jul. 13, 2020. Each of the above-referenced applications is hereby incorporated herein by reference in its entirety.

TECHNICAL FIELD

The technology disclosed in the present specification (hereinafter, "the present disclosure") relates to a training system that performs training of a machine learning model, a data collection device that performs processing of collecting learning data for training the machine learning model, and an information processing device that performs data analysis processing.

BACKGROUND ART

At present, digital cameras are widely used. For example, a digital video camera or a digital still camera is used to record daily life and various events such as an entrance ceremony and a graduation ceremony of a child, and a wedding in each household. Although It is desirable to image a more impressing scene, it is difficult for a general user to determine whether or not a scene that he/she is observing through a finder is an impressing scene. Of course, it is also difficult for a professional photographer to determine whether or not a scene that he/she is imaging is an impressing scene.

For example, a method of handling an impressing content by using an artificial intelligence technology equipped with a trained neural network model is conceivable. In particular, a deep learning neural network model (hereinafter, also referred to as "DNN") including a plurality of convolutional neural network layers can develop an artificial intelligence function capable of extracting features that cannot be imagined by a developer from a lot of data through training, that is, deep learning, and solving complex problems that the developer cannot assume an algorithm.

In order to use the artificial intelligence technology, learning data for training an artificial intelligence is required. For example, a training device including a learning data collection unit that collects learning data for machine learning of a specified ability and a training processing unit that performs machine learning of a learner in such a way as to acquire the specified ability by using the collected learning data has been proposed (see Patent Document 1). In order to handle an impressing content by using the artificial intelligence technology, first, a large amount of learning data used for training the machine learning model that generates a content that impresses people or estimates a camera operation for capturing an impressing content is required.

However, it is very difficult to collect the learning data due to the subjective nature of being impressed. A data collection method that reflects subjectivity by utilizing information regarding a taste appearing in a social network service (SNS) or the like is conceivable, but it is not easy to execute the data collection method since there is a possibility of threatening privacy. Furthermore, not only images and background music of an individual scene in a content, but also contexts of preceding and following scenes are considered to be elements that impress people, but it is difficult to collect data reflecting the contexts in a method of collecting data depending only on the images.

CITATION LIST

Patent Document

Patent Document 1: Japanese Patent Application Laid-Open No. 2018-149669

Non-Patent Document

Non-Patent Document 1: Using Brain Data for Sentiment Analysis, Gu et al., JLCL 2014.
Non-Patent Document 2: Music Emotion Classification: A Fuzzy Approach, Yang et al., ACM MM 2006.
Non-Patent Document 3: Visual Social Relationship Recognition, Li et al., arxiv 2018.
Non-Patent Document 4: Understanding Black-box Predictions via Influence Functions, Pang Wei Kho and Percy Liang <https://arxiv.org/abs/1703.04730>.
Non-Patent Document 5: Alex Kendall and Yarin Gal, "What Uncertainties Do We Need in Bayesian Deep Learning for Computer Vison", NIPS 2017.

SUMMARY OF THE INVENTION

Problems to be Solved by the Invention

An object of the present disclosure is to provide a training system that performs training of a machine learning model that estimates a camera operation for generating an impressing content or capturing the impressing content, a data collection device that performs processing of collecting learning data of the machine learning model that estimates the camera operation for generating an impressing content or capturing an impressing content, and an information processing device that analyzes an impression given by the collected data.

Solutions to Problems

The present disclosure has been made in view of the above problems, and a first aspect of the present disclosure is a training system including: a data collection device that collects data; and a training device that performs training of a machine learning model by using the data collected by the data collection device, in which the training device performs re-training of the machine learning model by using learning data that affects the training of the machine learning model to a predetermined degree or more, insufficient learning data, or data similar thereto, collected on the basis of a result of analyzing learning data that affects the training of the machine learning model.

However, the term "system" as used herein refers to a logical assembly of a plurality of devices (or functional modules that implement specific functions), and it does not matter whether or not the respective devices or functional modules are in a single housing.

The training device performs training of a machine learning model that generates an impressing content or estimates a camera operation for capturing an impressing content. Furthermore, the analysis can be performed by XAI, confidence score calculation, an influence function, or a Bayesian DNN.

The training device analyzes learning data that affects the training of the machine learning model, and transmits, to the data collection device, a request signal for requesting transmission of learning data that affects the training of the machine learning model to the predetermined degree or more, the insufficient learning data, or the data similar thereto on the basis of a result of the analysis. Then, as the data collection device transmits, to the training device, data collected on the basis of the received request signal, the training device can perform re-training of the machine learning model on the basis of the data transmitted from the data collection device in response to the request signal.

Alternatively, once the request signal is received from the training device, the data collection device transmits, to the training device, the learning data that affects the training of the machine learning model to the predetermined degree or more, the insufficient learning data, or the data similar thereto among the collected data on the basis of a result of analyzing an influence of the collected data on the training of the machine learning model. Then, the training device can perform re-training of the machine learning model on the basis of the data transmitted from the data collection device in response to the request signal. The training device may transmit information necessary for the analysis to the data collection device when transmitting the request signal.

Further, a second aspect of the present disclosure is a data collection device including:

a reception unit that receives a request signal for requesting transmission of learning data of a machine learning model from a training device that performs training of the machine learning model;

a data collection unit that collects learning data that affects the training of the machine learning model to a predetermined degree or more, insufficient learning data, or data similar thereto in response to the reception of the request signal; and a transmission unit that transmits the data collected by the data collection unit to the training device.

The reception unit receives, from the training device, the request signal for requesting the learning data that affects the training of the machine learning model to a predetermined degree or more, the insufficient learning data, or the data similar thereto. Then, the data collection unit collects data on the basis of the received request signal, and the transmission unit transmits, to the training device, the data collected by the data collection unit.

Alternatively, the data collection device according to the second aspect further includes an analysis unit that analyzes an influence of the data collected by the data collection unit on the training of the machine learning model. Then, the transmission unit transmits, to the training device, the learning data that affects the training of the machine learning model to the predetermined degree or more, the insufficient learning data, or the data similar thereto among the data collected by the data collection unit on the basis of a result of the analysis performed by the analysis unit.

Further, a third aspect of the present disclosure is an information processing device including:

a segment extraction unit that extracts a segment from a content on the basis of content evaluation information of the content and biological information of a person who views and listens the content;

a facial expression identification unit that detects a face of a person appearing in the segment and identifies a facial expression of the face;

a relationship estimation unit that estimates a relationship between persons appearing in the segment; and an impression identification unit that identifies an impression label of the segment on the basis of the facial expression of the face of the person appearing in the segment and the relationship between the persons.

The segment extraction unit extracts, from the content, a segment in which a high audience rating and biological information accompanying a positive emotion match. Furthermore, the segment extraction unit further extracts a segment in which a high audience rating and biological information accompanying a positive emotion do not match.

The relationship estimation unit estimates, as a context, a relationship between persons appearing in a current segment by using a result of detecting faces of the persons appearing in a past segment and identifying facial expressions of the detected faces.

An information processing device according to the third aspect further includes: a first emotion analysis unit that analyzes an emotion on the basis of text information obtained by recognizing a speech included in the segment; and a second emotion analysis unit that detects music included in the segment and analyzes an emotion given by the music. Then, the impression identification unit identifies an impression label of the segment in further consideration of the emotion identified from the text information by the first emotion analysis unit and the emotion identified from the music by the second emotion analysis unit.

The data collection device performs the analysis by confidence score calculation. In this case, the training device transmits, to the data collection device, information of the neural network model trained up to the current time point as information necessary for the analysis.

Effects of the Invention

According to the present disclosure, it is possible to provide the training system that performs training of the machine learning model that estimates the camera operation for generating an impressing content or capturing the impressing content, the data collection device that performs processing of collecting the learning data of the machine learning model that estimates the camera operation for generating an impressing content or capturing an impressing content, and the information processing device that identifies an impression given by the content.

Note that the effects described in the present specification are merely examples, and the effects achieved by the present disclosure are not limited thereto. Furthermore, the present disclosure may further exhibit additional effects in addition to the above effects.

Still other objects, features, and advantages of the present disclosure will become apparent by a more detailed description based on embodiments and accompanying drawings as described later.

MODE FOR CARRYING OUT THE INVENTION

Hereinafter, embodiments of the present disclosure will be described in detail with reference to the drawings in the following order.

Figure 1:
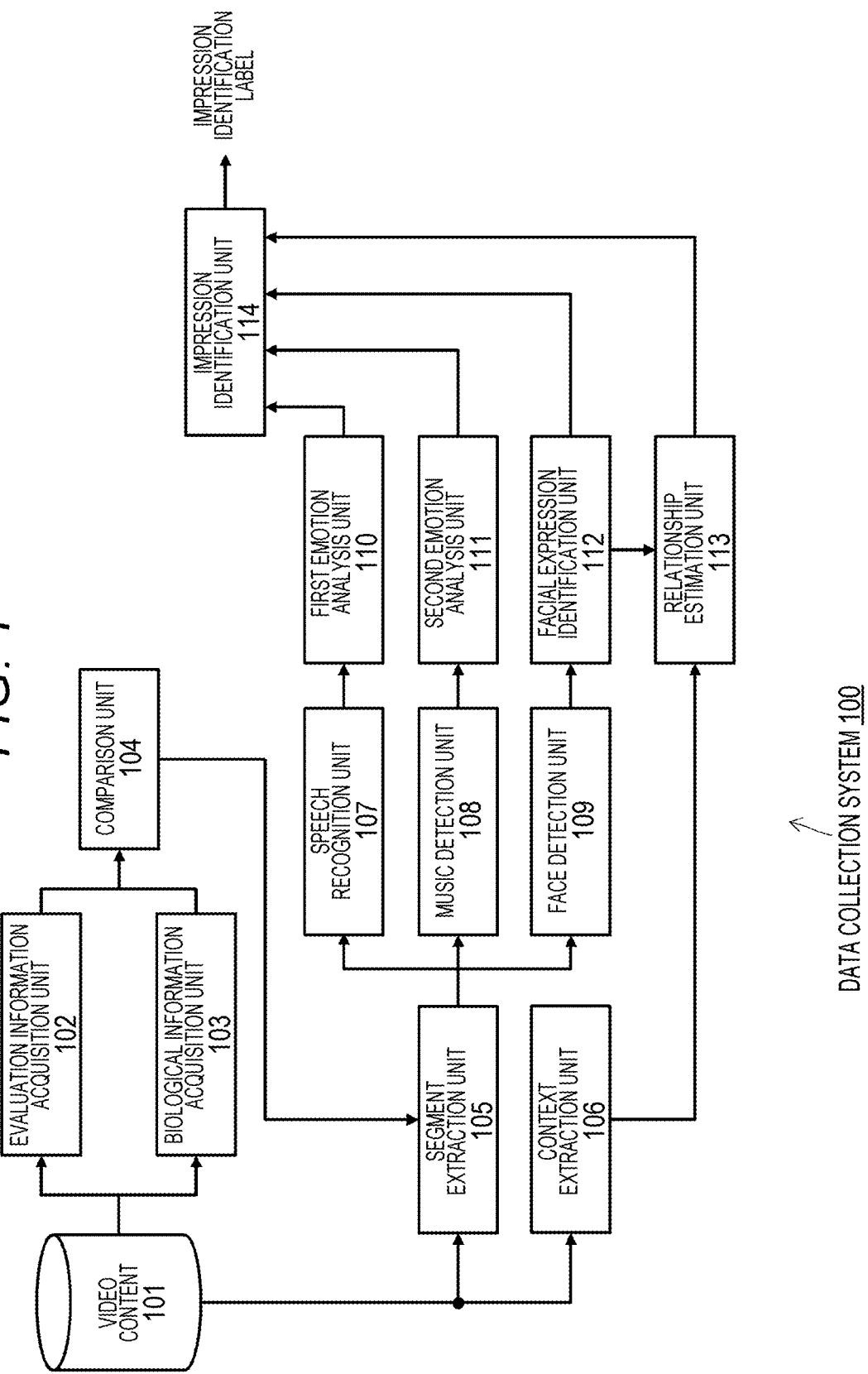
FIG. 1 is a diagram illustrating a functional configuration of a data collection system 100.

A. Configuration of System That Performs Processing of Collecting Data Regarding Machine Learning Model That Generates Impressing Content B. Operation of System That Performs Processing of Collecting Data Regarding Machine Learning Model That Generates Impressing Content C. Estimation of Relationship Between Persons included in Content D. Impression Identification E. Training Process Using Collected Data F. Inference G. Application H. Efficient Training of Machine Learning Model A. Configuration of System that Performs Processing of Collecting Data Regarding Learning Model that Generates Impressing Content FIG. 1 schematically illustrates a functional configuration of a data collection system 100 that performs data collection processing according to the present disclosure.

The illustrated data collection system 100 performs processing of collecting data used for training of a machine learning model that generates a content that impresses people on the basis of a massive amount of video contents 101 or estimates a camera operation for capturing an impressing content. Basically, the data collected by the data collection system 100 is used as learning data for training a machine learning model (for example, a neural network) for handling a content that impresses people (for example, for inferring whether or not the scene or content is a scene or content that impresses people). However, it is a matter of course that the data may be used for other purposes.

In the present embodiment, it is assumed that the data collection system 100 handles, as the video content 101, a content which is broadcasted on a television, an Internet broadcast station, or the like and to which content evaluation information such as audience rating information is assigned, and the content mainly includes video data, audio data, and the like. Furthermore, examples of the video content 101 may include various contents such as a content of a moving image sharing website as long as content evaluation information for evaluating the content, such as "good! (like, pleasant, and supportable)", similar to the audience rating information (or replaceable with the audience rating information), is assigned. In addition, the data collection system 100 processes a content extracted from the video contents 101 in units of fixed-length segments or variable-length segments.

The data collection system 100 includes a content evaluation information acquisition unit 102, a biological information acquisition unit 103, a comparison unit 104, a segment extraction unit 105, a context extraction unit 106, a speech recognition unit 107, a music detection unit 108, a face detection unit 109, a first emotion analysis unit 110, a second emotion analysis unit 111, a facial expression identification unit 112, a relationship estimation unit 113, and an impression identification unit 114. The data collection system 100 is assumed to be configured as, for example, the cloud, that is, a service in which computer resources are provided on a wide-area computer network such as the Internet. The respective components of the data collection system 100 may be aggregated in one computer or distributed to a plurality of computers. Each unit will be described below.

The content evaluation information acquisition unit 102 acquires content evaluation information such as an audience rating assigned to the content extracted from the video contents 101. The content evaluation information acquisition unit 102 may acquire the audience rating information of a target content from an audience rating survey company. In the present embodiment, the data collection system 100 uses the audience rating information to determine whether or not each scene of the content impresses people. Advantages of using the audience rating information include that the audience rating information does not conflict with privacy issues, and that the audience rating information is information in which reactions of a large number of people are already reflected. Furthermore, since the audience rating information also reflects a context such as a narrative arc of a content, context information before and after a scene with a high audience rating can also be effectively used. Moreover, in a case of a content to which the audience rating information is assigned, for example, additional information (for example, lines, background music, or the like) frequently accompanying the scene is added. As will be described later, lines and background music of an impressing scene play a large role in giving an impression to people and should be used to widen the range of applications. Note that the content evaluation information acquisition unit 102 may acquire the content evaluation information such as "good! (like, pleasant, and supportable)" in an SNS or the like in addition to the audience rating information (alternatively, instead of the audience rating information).

The biological information acquisition unit 103 acquires biological information of a person who views and listens the content extracted from the video contents 101. For example, a biological information sensor that detects biological information such as brain waves, sweating, a line-of-sight, and a myoelectric potential may be installed in a home, and the biological information acquisition unit 103 may collect the biological information detected when a person views and listens a content broadcast on a television, the Internet, or the like. In a case where a massive amount of biological information is collected from a large number of households, the biological information acquisition unit 103 may use the collected biological information after performing statistical processing such as averaging.

The biological information of a person who views and listens a reproduced content, such as brain waves, sweating, a line-of-sight, or a myoelectric potential, reacts to a scene for which the person feels a sense of tension, sadness, anger, or the like. Meanwhile, the audience rating information is an index indicating how many households and people are viewing the content, but a scene for which people are impressed is not necessarily reflected in the audience rating information. Therefore, the data collection system 100 uses the biological information such as brain wave information acquired by the biological information acquisition unit 103 in order to interpolate the content evaluation information in consideration of a risk that it is not possible to accurately determine whether or not each scene of the content impresses people only with the content evaluation information such as an audience rating. Studies for identifying emotions from the brain wave information have already been conducted (see, for example, Non-Patent Document 1). Therefore, it is possible to estimate an emotion that results in a high audience rating on the basis of the brain wave information of a person who views and listens each scene of a content. Note that the brain waves refer to a potential obtained by measuring electric activity in the brain through the scalp. An electroencephalograph is generally configured to measure a brain potential by using electrodes placed on the scalp. International 10-20 system has been known as a method describing locations of arranged electrodes, but the present disclosure is not particularly limited thereto.

The comparison unit 104 compares the content evaluation information such as the audience rating acquired by the content evaluation information acquisition unit 102, with the biological information of a person acquired by the biological information acquisition unit 103. Then, the segment extraction unit 105 extracts, as data to be used for learning of impression identification, a segment in which a high audience rating and biological information accompanying a positive emotion (such as "impressed") match, from the content extracted from the video contents 101. Furthermore, the segment extraction unit 105 also extracts, as a negative ("not impressed" or the like) sample, a segment in which a high audience rating and biological information accompanying a positive emotion do not match.

The context extraction unit 106 extracts a context of the content extracted from the video contents 101. More specifically, the context extraction unit 106 extracts a context before and after a scene with a high audience rating or a context before and after a segment extracted by the segment extraction unit 105. The context extraction unit 106 may extract a context by using a trained neural network model trained to perform context estimation on the basis of a content including a video and audio data.

The speech recognition unit 107 applies speech recognition processing (automatic speech recognition (ASR)) to a speech component in audio data included in a segment extracted by the segment extraction unit 105, recognizes a speech such as lines, and converts the speech into a text (speech transcription).

The first emotion analysis unit 110 applies natural language processing of performing emotion analysis on text information such as lines output from the speech recognition unit 107 to analyze an emotion in a segment (scene). The first emotion analysis unit 110 may perform emotion analysis with a wider context with reference to lines of the preceding and following segments (scenes). It is possible to more accurately grasp an emotion of a segment (scene) on the basis of a result of performing emotion analysis on lines.

Each of the speech recognition unit 107 and the first emotion analysis unit 110 can be implemented using a trained machine learning model such as a convolutional neural network (CNN). Furthermore, the speech recognition unit 107 and the first emotion analysis unit 110 can be combined as a "speech identifier", and can be implemented by a machine learning model such as one CNN.

The music detection unit 108 applies music detection processing to audio data included in a segment extracted by the segment extraction unit 105 to detect background music added to a video.

The second emotion analysis unit 111 identifies whether or not background music detected by the music detection unit 108 is atmospheric or impressing. Several technologies for identifying an emotion given by music have been proposed (see, for example, Non-Patent Document 2). It is possible to more accurately grasp an emotion of a segment (scene) on the basis of a result of performing emotion analysis on background music.

Each of the music detection unit 108 and the second emotion analysis unit 111 can be implemented using a trained machine learning model such as a CNN. Furthermore, the music detection unit 108 and the second emotion analysis unit 111 can be collectively implemented as a "music identifier" by a machine learning model such as one CNN.

The face detection unit 109 performs processing of detecting a face of a person appearing in video data included in a segment extracted by the segment extraction unit 105.

The facial expression identification unit 112 identifies a facial expression of a face detected by the face detection unit 109. For example, the facial expression identification unit 112 analyzes a pattern of a face image from a detected face, and estimates an emotion corresponding to the pattern of the face image. It is possible to estimate an emotion of a person by using artificial intelligence that has learned a correlation between a pattern of a face image and an emotion of a person in advance. Note that the pattern of the face image can be configured by a combination of face parts such as eyebrows, eyes, nose, mouth, and cheeks, and can also be configured by an image of an entire face without dividing the face into the face parts.

Each of the face detection unit 109 and the facial expression identification unit 112 can be implemented using a trained machine learning model such as a CNN. Furthermore, the face detection unit 109 and the facial expression identification unit 112 can be collectively implemented as a "facial expression identifier" by a machine learning model such as one CNN.

In a case where there are two or more persons in a segment, the relationship estimation unit 113 estimates a relationship between the persons and the degree of intimacy between the persons on the basis of the facial expression of each person identified by the facial expression identification unit 112 and a context with the preceding and following segments extracted by the context extraction unit 106. This is because, even in a case where a certain person has the same facial expression, an easiness of making a person who has seen the facial expression be impressed differs depending on a relationship with another person who appears together and the degree of intimacy (for example, whether or not the person appears together with a family member or a close friend), and such a difference affects impression identification processing on the downstream side.

The impression identification unit 114 identifies an impression for a segment on the basis of a result of performing emotion identification a speech (lines or the like) in the segment by the speech recognition unit 107 and the first emotion analysis unit 110, a result of identifying an emotion or atmosphere of background music in the segment by the music detection 108 and the second emotion analysis unit 111, a result of identifying a facial expression of a person appearing in the segment by the face detection unit 109 and the facial expression identification unit 112, and a result of estimating a relationship and the degree of intimacy between persons appearing in the segment by the relationship estimation unit 113.

The impression identification unit 114 estimates an impression for a segment from the above input data by using, for example, a trained neural network model, and outputs an impression identification label indicating the level of the impression for the segment. The impression identification label may be two simple binary labels including a positive label (such as "impressed") and a negative label (such as "not impressed"), or may be a label indicating various subdivided impressions such as "anger", "disgust", "fear", "happy", "sad", "surprise", and the like. The impression identification unit 114 may output an impression identification label defined on the basis of an emotion model such as a Wundt model or a Plutchik model, for example.

Figure 2:
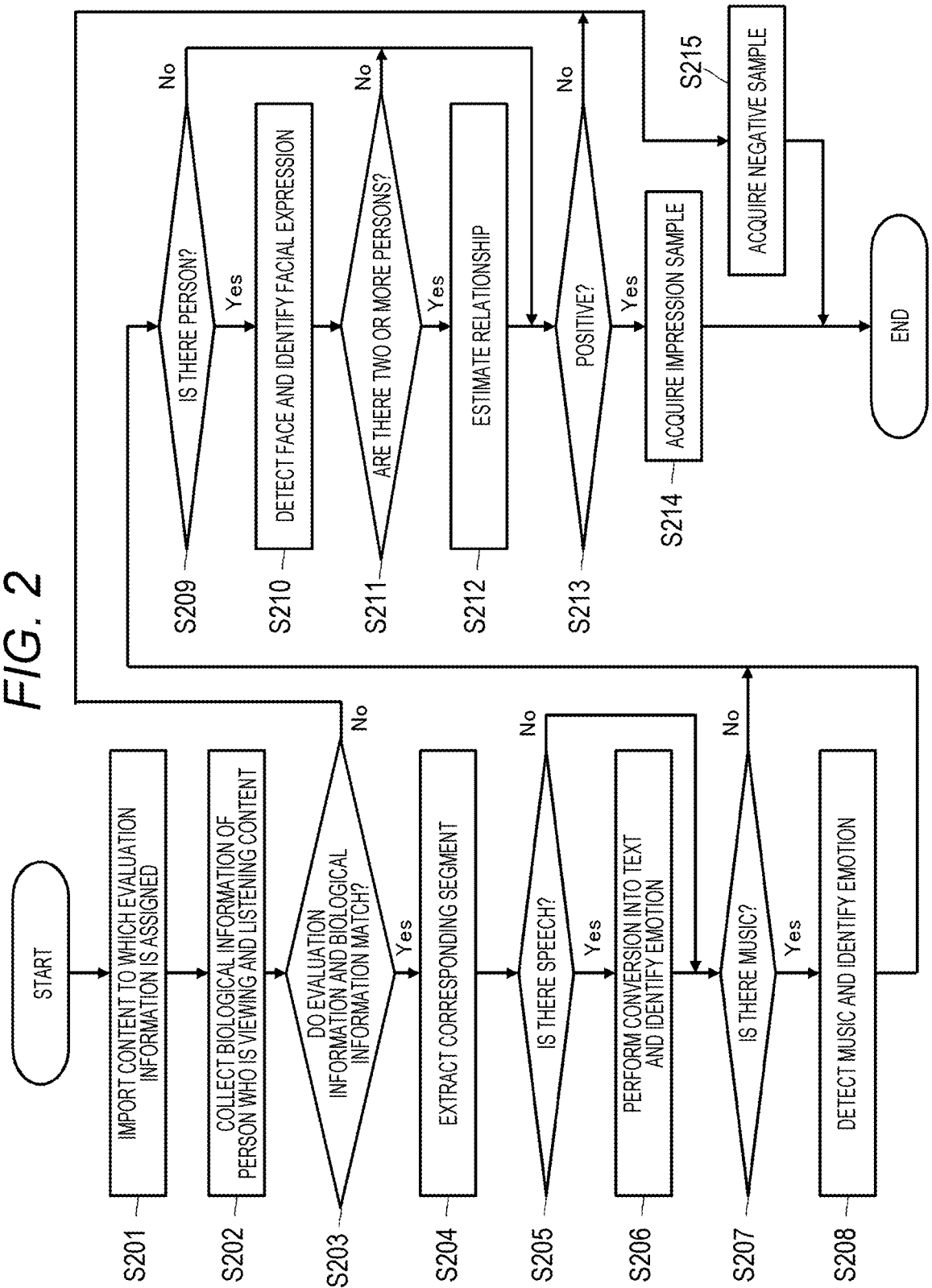
FIG. 2 is a flowchart illustrating an operation of the data collection system 100.

B. Operation of System that Performs Processing of Collecting Data Regarding Machine Learning Model that Generates Impressing Content FIG. 2 illustrates an operation of the data collection system 100 in the form of a flowchart.

First, a content which is broadcast on a television, an Internet broadcast station, or the like and to which the content evaluation information such as an audience rating is assigned is imported to the data collection system 100 (Step SS201). The content evaluation information acquisition unit 102 acquires the content evaluation information assigned to the content. It is assumed that the content includes a plurality of segments, and the content evaluation information is assigned to each segment.

The biological information acquisition unit 103 acquires the biological information such as brain waves representing a reaction of a person who is viewing and listening the content imported in Step S201 (Step S202). In a case where the content is broadcast on a television, it is assumed that the biological information including at least brain waves is collected from a large number of households that view and listen the television program.

The comparison unit 104 compares, for each segment, the content evaluation information acquired by the content evaluation information acquisition unit 102 with the biological information of the person acquired by the biological information acquisition unit 103, and checks whether or not a high audience rating and biological information accompanying a positive emotion match (Step S203).

Here, the segment extraction unit 105 extracts, as data to be used for learning of impression identification, a segment in which a high audience rating and biological information accompanying a positive emotion match (Yes in Step S203), from the content extracted from the video contents 101 (Step S204). Furthermore, the segment extraction unit 105 extracts, as a negative sample, a segment in which a high audience rating and biological information accompanying a positive emotion do not match (No in Step S203) (Step S215).

In a case where the segment extracted in Step S204 includes speech data (Yes in Step S205), the speech recognition unit 107 performs speech recognition and converts the speech data into a text, and the first emotion analysis unit 110 identifies an emotion on the basis of the text information (Step S206).

Furthermore, in a case where the segment extracted in Step S204 includes music data (Yes in Step S207), the music detection unit 108 detects the music, and the second emotion analysis unit 111 identifies an emotion given by the music (Step S208).

Furthermore, in a case where a person appears in the segment extracted in Step S204 (Yes in Step S209), the face detection unit 109 detects the face of the person, and the facial expression identification unit 112 identifies the facial expression of the detected face (Step S210).

Furthermore, in a case where two or more persons appear in the segment extracted in Step S204 (Yes in Step S211), the relationship estimation unit 113 estimates a relationship between the persons on the basis of the facial expression of each person identified by the facial expression identification unit 112 and a context with the preceding and following segments extracted by the context extraction unit 106 (Step S212).

The impression identification unit 114 identifies an impression for the segment on the basis of a result of performing emotion identification the speech (lines or the like) in the segment by the speech recognition unit 107 and the first emotion analysis unit 110, a result of identifying an emotion or atmosphere of the background music in the segment by the music detection 108 and the second emotion analysis unit 111, a result of identifying the facial expression of the person appearing in the segment by the face detection unit 109 and the facial expression identification unit 112, and a result of estimating the relationship between the persons appearing in the segment by the relationship estimation unit 113 (Step S213).

The impression identification unit 114 estimates the impression for the segment and outputs an impression identification label indicating the level of the impression for the segment. The impression identification label may be two simple binary labels including a positive label and a negative label or may be a label indicating various impressions such as "anger", "disgust", "fear", "happy", "sad", "surprise", and the like. As a result, it is possible to obtain samples having labels indicating a positive impression or various impressions such as "anger", "disgust", "fear", "happy", "sad", "surprise", and the like (Step S214). Furthermore, a negative sample that does not give a positive emotion to people is also acquired (Step S215).

The data collection system 100 can extract a segment (scene) that impresses people from a content broadcast on a television, the Internet, or the like, and further identify an impression label for each segment on the basis of a result of performing emotion analysis on a speech and background music included in the segment, a result of identifying a facial expression of a person appearing in the segment, and a result of estimating a relationship between persons in a case where two or more persons appear in the segment, according to a processing procedure illustrated in FIG. 2. Then, a segment with an emotion label collected by the data collection system 100 can be used for learning data for training an impression identifier using artificial intelligence (neural network model).

C. Estimation of Relationship Between Persons Included in Content

In this section, the processing of estimating a relationship between persons in a video performed by the relationship estimation unit 113 will be described in detail.

In a case where there is one person in a video, an emotion can be identified from the facial expression of the detected face of the person. On the other hand, in a case where two persons appear in the video, a relationship is established between the persons, and thus, it is necessary to consider the relationship between the persons when identifying an impression from the person.

For example, even in a video in which the same person A appears, in a case where the person A and a person B appearing together with the person A are persons having a close relationship such as family and friends and have a high degree of intimacy, the video is likely to be impressing. On the other hand, in a case where the degree of intimacy between the person A and the person B is low, the video does not impress people in some cases. In this way, it is very important to grasp a relationship between subjects in estimating whether or not the video impresses people.

A technology for machine-learning subject information on the basis of information posted on an SNS or the like has already been known. However, in a case where it is attempted to grasp a human relationship such as a relationship between subjects from the posted information on the SNS, there is a possibility that privacy of the subjects is threatened, and thus, it is not easy to apply the technology. On the other hand, in the present disclosure, the relationship estimation unit 113 estimates a relationship between persons on the basis of a facial expression of each person identified by the facial expression identification unit 112 and a context with the preceding and following segments extracted by the context extraction unit 106, and thus, no privacy problem occurs.

Although a technology for estimating a relationship between persons on the basis of facial expression identification for each person has already been known, many of this type of technology remain at a one-dimensional level of simply connecting a positive facial expression to a positive emotion. However, an emotion label superficially identified from the facial expression does not necessarily match the emotion of the person. For example, in a case of a photograph taken with a friend, the person may make an angry facial expression on purpose. In addition, in a case of a photograph taken at an official event with a heavy atmosphere, it may be understood that there is obviously no close relationship even in a case where persons smile. That is, it is not possible to simply estimate a relationship between persons by identifying facial expressions of the persons. It is necessary not only to simply identify whether or not a video impresses people on the basis of a facial expression of a face of a person appearing in the video but also to grasp the degree of intimacy between two or more persons appearing in the video. In a case of a video in which persons with a high degree of intimacy appear, it is highly likely that the video impresses people.

Studies for recognizing a relationship between persons on the basis of visual data have already been actively conducted (see, for example, Non-Patent Document 3). In the present disclosure, since the relationship estimation unit 113 estimates a relationship between persons by using not only information (for example, a facial expression of each person identified from a video in a segment) of the segment extracted by the segment extraction unit 105 but also a context with the preceding and following segments, it can be expected that the accuracy of the estimation is improved. Furthermore, it is also conceivable to use meta information (for example, information of a broadcast program) of a content itself easily obtained from an information source such as the Internet to estimate a relationship between persons.

Figure 3:
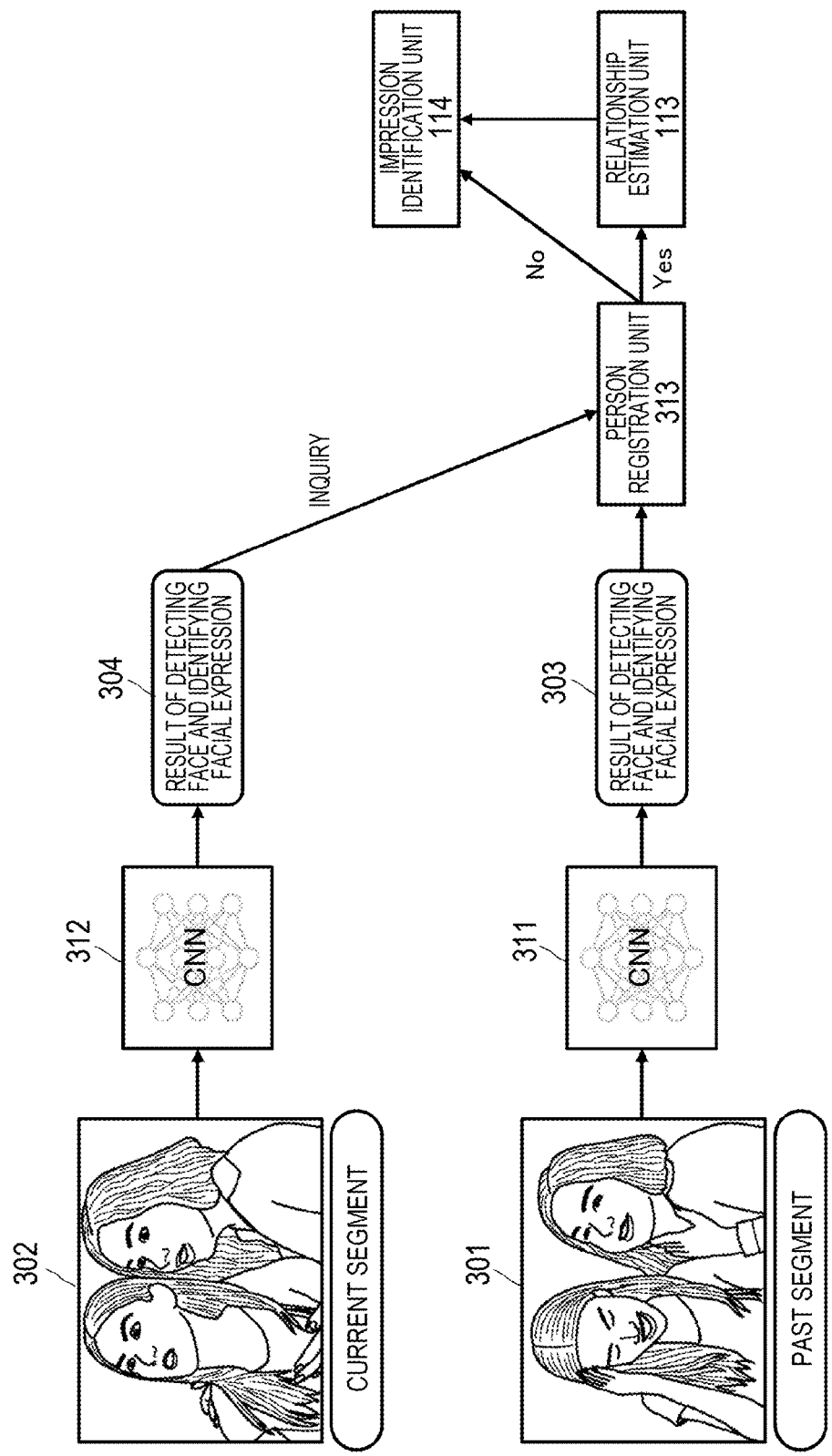
FIG. 3 is a diagram illustrating a mechanism for estimating a relationship between persons on the basis of a context of a segment and a result of detecting faces and identifying facial expressions.

FIG. 3 illustrates a mechanism in which the relationship estimation unit 113 estimates a relationship between persons on the basis of a context of a segment and a result of detecting faces and identifying facial expressions. In the example illustrated in FIG. 3, the relationship estimation unit 113 uses, in addition to a result of detecting a face of each person appearing in the current segment extracted by the segment extraction unit 105 and identifying a facial expression of the detected face, a result of detecting a face of each person appearing in the past segment and a facial expression of the detected face as a context.

First, a past segment 301 is input to a CNN 311 implementing the face detection unit 109 and the facial expression identification unit 112, and the CNN 311 detects a face of each person appearing in the past segment 301 and identifies a facial expression of the detected face. Then, the relationship estimation unit 113 registers the person whose face has been detected from the past segment 301 and a facial expression identification result 303 of the person in a person registration unit 313.

Next, a current segment 302 extracted by the segment extraction unit 105 is input to a CNN 312 implementing the face detection unit 109 and the facial expression identification unit 112, the CNN detects a face of each person appearing in the current segment 302 and identifies a facial expression of the detected face, and outputs a result 304 of detecting the face and identifying the facial expression of the detected face. Then, the relationship estimation unit 113 inquires of the person registration unit 313 whether or not the person detected from the current segment 302 is a person pre-registered from the past segment 301.

Here, in a case where the person detected from the current segment 302 is a person pre-registered from the past segment 301, the relationship estimation unit 113 estimates a relationship between the persons by using a facial expression identification result estimated from the past segment 301 in addition to a facial expression identification result estimated from the current segment 302 for the same person. In a case where the relationship between the persons is more accurately estimated by the relationship estimation unit 113 using the context of the segment, the impression identification unit 114 on the downstream side can more accurately identify the impression label of the current segment.

Furthermore, in a case where the person detected from the current segment 302 is not a person pre-registered from the past segment 301, the relationship estimation unit 113 estimates the relationship between the persons on the basis of only the facial expression identification result estimated from the current segment 302. Alternatively, the impression identification unit 113 on the downstream side identifies the impression label of the current segment on the basis of the facial expression identification result estimated from the current segment without using the relationship between the persons.

D. Impression Identification

In this section, the processing of identifying an impression for a segment by the impression identification unit 114 will be described in detail.

The impression identification unit 114 identifies the impression label of the current segment by collectively considering the following plural information.

(1) A result of identifying an emotion in a speech (such as lines) in a segment by the speech recognition unit 107 and the first emotion analysis unit 110
(2) A result of identifying an emotion or atmosphere of background music in the segment by the music detection 108 and the second emotion analysis unit 111
(3) A result of identifying a facial expression of a person appearing in the segment by the face detection unit 109 and the facial expression identification unit 112
(4) A result of estimating a relationship and the degree of intimacy between persons appearing in the segment by the relationship estimation unit 113

In a case where the above (1) to (4) all indicate a positive emotion, the impression identification unit 114 labels the current segment as an impressing scene.

Furthermore, in a case where some pieces of information of the above (1) to (4) are missing (for example, in a case where the current segment does not have background music, or in a case where no person appears and there is thus no facial expression identification result), and all pieces of the existing information indicate a positive emotion, the impression identification unit 114 may label the current segment as an impressing scene. In a case where some pieces of information are missing, there is a possibility that the reliability of impression identification is lowered. However, since the segment itself has already satisfied the condition that the content evaluation information and the brain wave information match in the segment extraction unit 105, it is considered that the reliability is not drastically lowered.

Furthermore, in a case where all the pieces of information (1) to (4) indicate that the current segment cannot be labeled as being impressing, the impression identification unit 114 may assign a negative label to the segment. The segment to which the negative label is assigned can be used for learning data for training the impression identifier as a negative sample.

As described above, each identifier that identifies a speech, music, and a facial expression of a face of a person included in a segment is implemented by a trained machine learning model such as a CNN. The impression identification unit 114 can assign a label indicating various subdivided impressions such as "anger", "disgust", "fear", "happy", "sad", "surprise", and the like, instead of two simple binary labels including a positive label and a negative label, depending on how each identifier has been trained in advance. That is, the data collection system 100 can collect learning data with various impression identification labels, and can be used for training of the impression identifier that identifies various impressions.

E. Training Process Using Collected Data

In this section, a training process of training the impression identifier by using the learning data collected using the data collection system 100 according to the present disclosure will be described in detail. The impression identifier is a device that identifies an impression given by a content. The device referred to herein means both a device implemented by dedicated hardware and a device that executes software to implement a predetermined function.

Figure 4:
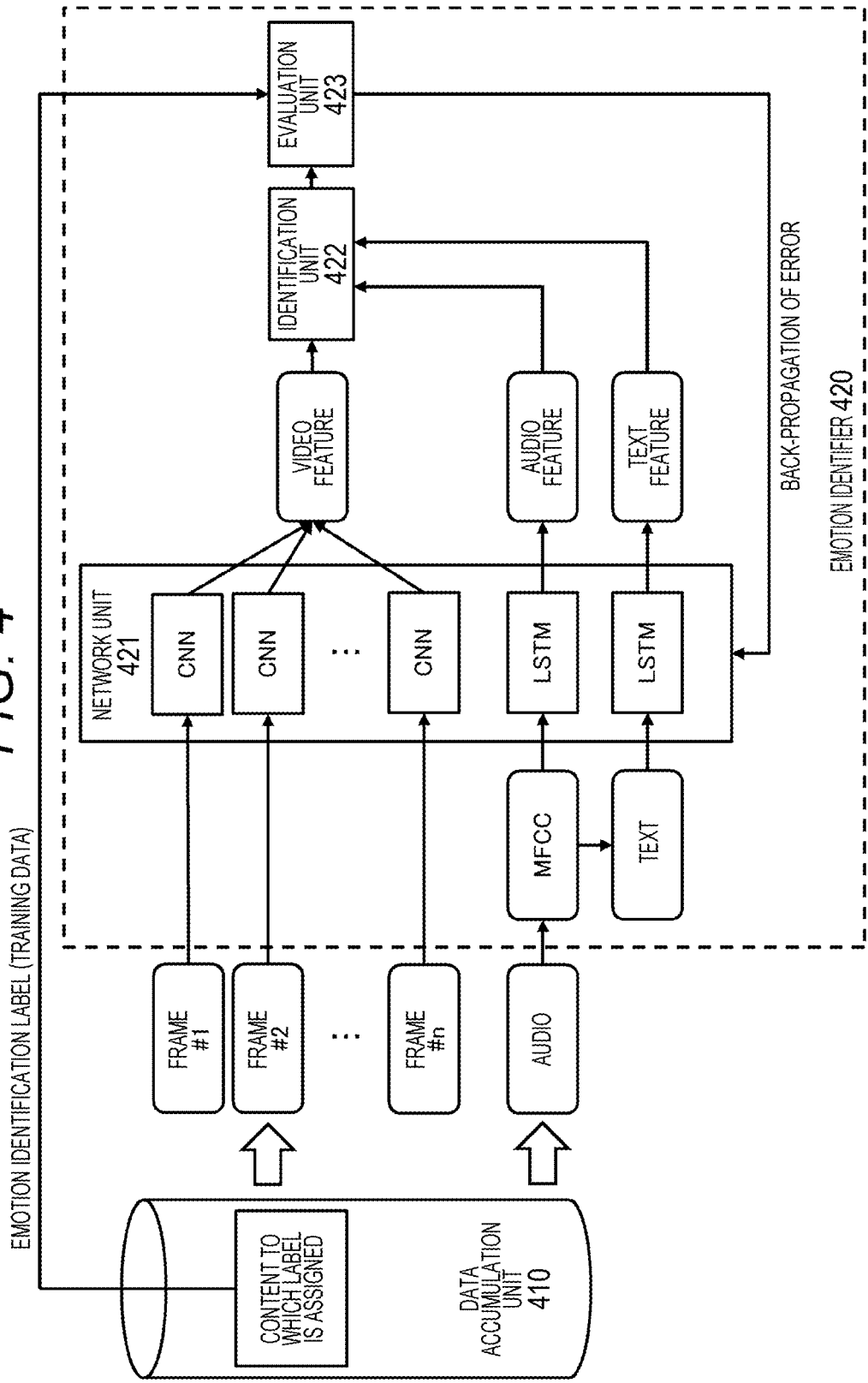
FIG. 4 is a diagram illustrating an overall flow of a training process for an impression identifier using collected learning data.

FIG. 4 schematically illustrates an overall flow of the training process for the impression identifier using the collected learning data.

The learning data collected using the data collection system 100 is stored in a data accumulation unit 410. Each piece of learning data corresponds to what is called "segment" in the above sections A to D. The segment as the learning data is an element of a content broadcast on a television, the Internet, or the like, and includes video data including a frame sequence and audio data synchronized with the video. In addition, the impression identification label is finally assigned to the segment as the learning data as training data in a process of the processing in the data collection system 100. The impression identification label may be subdivided into various types, but in this section, two simple binary labels including a positive label and a negative label are assigned for simplification of explanation.

An impression identifier 420 includes a network unit 421 including a plurality of network models to which video and audio data as the learning data are input, and an identification unit 422 that identifies an impression label of a content on the basis of a feature acquired by the network unit 421. Each network in the network unit 421 has a parameter (such as a connection weight coefficient between nodes).

In a case of a video, a video feature is obtained by acquiring respective features through a trained neural network model (CNN) in the network unit 421 for each frame and organizing the features. There are various methods for organizing a feature of a frame, and examples thereof include simple concatenation and a method of sequentially inputting features to a time-series network such as a long short term memory (LSTM). In the present embodiment, in a case where there are two or more persons in a frame, a relationship between the persons estimated on the basis of a context of a plurality of consecutive frames is acquired as the video feature.

On the other hand, in a case of audio data, conversion into a feature such as mel-frequency cepstrum coefficients (MFCC) or a mel-spectrogram is made, and the feature is input to a time-series network such as an LSTM in the network unit 421, whereby the audio feature can be acquired. In addition, it is possible to obtain a text feature by transcribing a feature of a speech into a text and inputting the text to a time-series network such as an LSTM in the network unit 421.

The identification unit 422 projects the video feature, the audio feature, and the text feature obtained as described above to a common space, and assigns the impression identification label to the learning data input to the impression identifier 420. Here, the identification unit 422 assigns either a positive binary label or a negative binary label.

An evaluation unit 423 calculates a loss function Loss such as softmax based on an error between the impression identification label assigned to the learning data by the identification unit 422 and the impression identification label as the training data assigned to the learning data by the data collection system 100. Alternatively, the loss function Loss may be obtained on the basis of the sum of respective errors $L_{video}$, $L_{text}$, and $L_{Audio}$ by individually identifying the impression identification label based on the video feature, the impression identification label based on a feature of a speech, and the impression identification label based on the audio feature. Then, the loss function Loss obtained on the basis of the errors is back-propagated to each network having a parameter in the network unit 421, and the parameter of each network (CNN or LSTM) in the network unit 421 is updated in such a way that the loss function Loss is minimized. As a result, learning proceeds in such a way that the impression identifier 420 outputs the impression identification label for the input learning data to make the input learning data be equivalent to the training data.

F. Inference

In the above section A, the method in which the data collection system 100 collects data from a content broadcast on a television, the Internet, or the like by using the content evaluation information and the biological information such as brain waves has been described. Furthermore, in the above section E, the process of training the impression identifier 420 by using the data collected by the data collection system 100 has been described.

The impression identifier 420 trained through the training process can identify an impressing content or an impression given by a content. The content referred to herein includes various types of contents such as a content broadcast on a television, the Internet, or the like, a moving image content shared on a moving image sharing website, and a content of a moving image or still image captured by a user with a digital camera, and it is not necessary that the content evaluation information or the biological information such as brain waves is assigned.

G. Application

As described above, the learning data collected by the data collection system according to the present disclosure can be used to train a machine learning model for an emotion identifier that identifies an emotion that a content gives to people. In addition, various applications are expected for the emotion identifier developed in this manner.

G-1. Configuration of Digital Camera

The emotion identifier developed on the basis of the present disclosure can be mounted on various content processing devices that perform content processing such as content recording, content reproducing, and content editing, and examples of the content processing devices include a digital camera.

Figure 5:
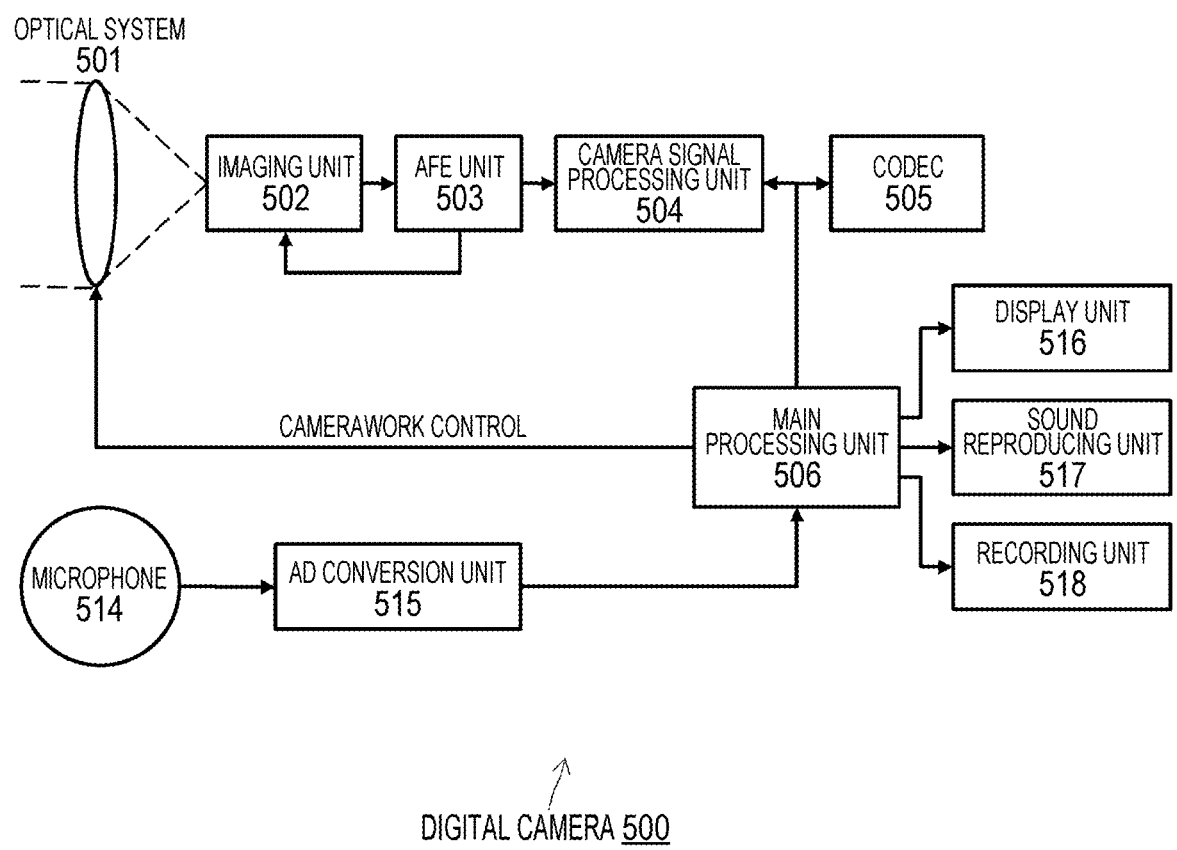
FIG. 5 is a diagram illustrating a configuration example of a digital camera 500.

FIG. 5 illustrates a configuration example of a digital camera 500. The illustrated digital camera 500 includes an optical system 501, an imaging unit 502, an analog front end (AFE) unit 503, a camera signal processing unit 504, a codec 505, a main processing unit 506, a microphone 514, an A/D conversion unit 515, a display unit 516, a sound reproducing unit 517, and a recording unit 518. It is assumed that the emotion identifier developed on the basis of the present disclosure is mounted on the digital camera 500.

The optical system 501 includes a lens for condensing light from a subject on an imaging surface of the imaging unit 502, a drive mechanism for moving the lens to perform focusing and zooming, a shutter mechanism for causing the light from the subject to be incident on the imaging surface for a predetermined time by an opening/closing operation, and an iris (aperture) mechanism for limiting a direction and a range of a light beam from the subject (all of them are not illustrated). A driver (not illustrated) controls camerawork such as driving (for example, a subject focusing operation, an iris operation, a panning operation, and a tilting operation, a shutter operation, or a timing of a self-timer setting) of each mechanism in the optical system 501 on the basis of a control signal from the main processing unit 506 to be described later.

The imaging unit 502 includes an imaging element such as a charge coupled device (CCD) or a complementary metal oxide semiconductor (CMOS), has the imaging surface in which respective pixels having a photoelectric conversion effect are two-dimensionally arranged, and converts incident light from a subject into an electrical signal. For example, a G-checkered RB-color coding single panel is disposed on a light receiving side. Signal charges corresponding to the amount of incident light passing through each color filter are accumulated in each pixel, and the color of the incident light at a pixel position can be reproduced on the basis of the amount of signal charges of each of three colors read from each pixel. Note that an analog image signal output from the imaging unit 502 is a primary color signal of each of RGB colors, and may also be a color signal of a complementary color system.

The AFE unit 503 performs sampling and holding after suppressing low noise of an imaging signal with high accuracy (correlated double sampling (CDS)), performs appropriate gain control by automatic gain control (AGC), performs AD conversion, and outputs a digital image signal. Furthermore, the AFE unit 503 outputs, to the imaging unit 502, a timing pulse signal for driving the imaging element and a drive signal for outputting charges of each pixel of the imaging element in units of lines in a vertical direction according to the timing pulse signal.

The camera signal processing unit 504 performs preprocessing such as defective pixel correction, digital clamping, and digital gain control on the image signal transmitted from the AFE unit 503, then applies a white balance gain by auto white balance (AWB), performs image quality correction processing such as sharpness and chroma/contrast adjustment, reproduces an appropriate color state, and further creates an RGB screen signal by demosaic processing. Furthermore, the camera signal processing unit 504 performs resolution conversion according to whether to display and output a captured image as a through image on the display unit 516 or store the captured image in the recording unit 518, and performs codec processing such as moving picture experts group (MPEG).

The main processing unit 506 includes a processor, a random access memory (RAM), and a read only memory (ROM), and integrally controls the operation of the entire digital camera 500. The processor is a central processing unit (CPU), a graphics processing unit (GPU) having multiple cores, or the like. At the time of recording, the main processing unit 506 stores, in the recording unit 518, video data captured by the imaging unit 502 and audio data collected by the microphone 514. Furthermore, at the time of reproduction, the main processing unit 506 reads the video data and the audio data from the recording unit 518, and outputs the video data and the audio data on the display unit 516 and the sound reproducing unit 517. Furthermore, in the present embodiment, it is assumed that the emotion identifier developed on the basis of the present disclosure is mounted on the main processing unit 506.

The display unit 516 is a device that displays a video that is being captured or a recorded video, such as a liquid crystal display panel mounted on the digital camera 500 or an external television or projector.

The sound reproducing unit 517 is a device that reproduces a recorded speech, such as a speaker mounted on the digital camera 5100 or an external speaker.

The recording unit 518 is a large-capacity recording device such as a hard disc drive (HDD) or a solid state drive (SSD). A content including a video captured by the imaging unit 502 and audio data collected by the microphone 514 in synchronization with the video is recorded in the recording unit 518. In addition, a parameter (for example, a connection weight coefficient between neurons in a neural network model) of a machine learning model for the emotion identifier is recorded in the recording unit 518.

G-2. Labeling of Captured Content

Next, a function implemented by mounting the emotion identifier developed on the basis of the present disclosure on the digital camera 500 will be described.

It is possible to assign the impression identification label of a content and extract a scene (segment) that impresses people in the content by applying the content captured by the digital camera 500 to the impression identifier.

Figure 6:
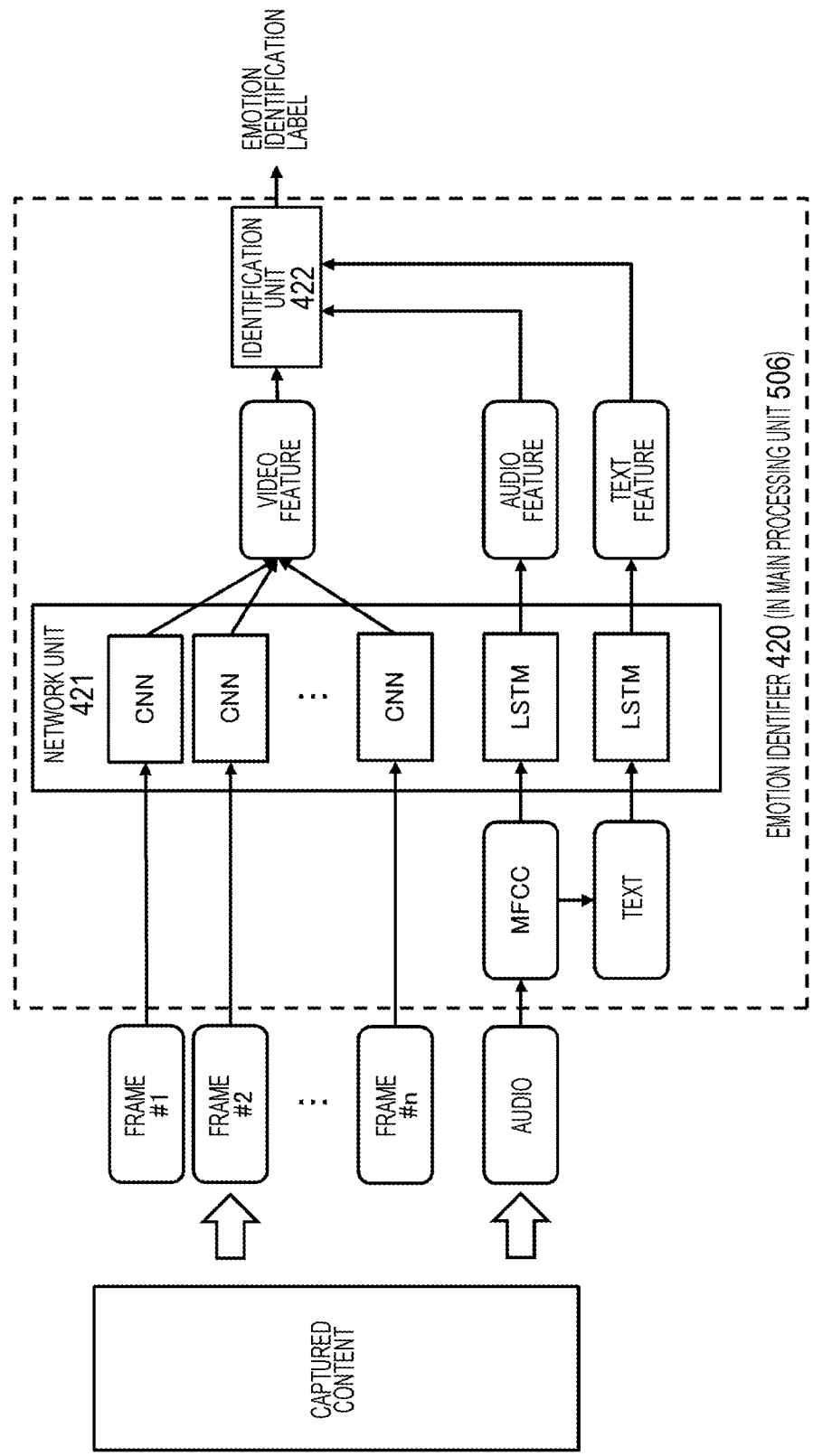
FIG. 6 is a diagram illustrating a functional configuration for performing impression identification labeling for a content captured by the digital camera 500.

FIG. 6 illustrates a functional configuration for performing impression identification labeling for a content captured by the digital camera 500. In the drawing, the configuration of the impression identifier 420 is the same as that illustrated in FIG. 4. It is assumed that the impression identifier 420 operates in the main processing unit 506 in the digital camera 500.

In a video of a content captured by the digital camera 500, respective features are acquired through the trained neural network model (CNN) in the network unit 421 for each frame, and the features are organized to obtain the video feature. Furthermore, audio data recorded in synchronization with the video is converted into a feature such as MFCC and input to a time-series network such as an LSTM in the network unit 421, whereby the audio feature is obtained. In addition, the text feature can be obtained by transcribing a feature of a speech into a text and inputting the text feature into a time-series network such as an LSTM in the network unit 421.

The identification unit 422 projects the video feature, the audio feature, and the text feature obtained as described above to the common space, and assigns the impression identification label to the learning data input to the impression identifier 420. The identification unit 422 assigns either a positive binary label or a negative binary label. Alternatively, the identification unit 422 may assign a label indicating various subdivided impressions.

In any case, the identification unit 422 assigns the impression identification label to a captured content for each scene (or segment). The assigned impression identification label is recorded as, for example, meta information of the content. In a case of reproducing a recorded content, it is possible to select an impressing scene by using the impression identification label as a search key and view and listen the impressing scene. Furthermore, in a case of editing a recorded content, it is possible to select only a scene with a specific emotion, such as a "joyful" scene or a "sad" scene, by using the impression identification label as a search key.

As described above, the data collection system 100 according to the present disclosure can assign the impression identification label for identifying the type of impression that can be given to people for each input content or each segment in a content. Therefore, the data collection system 100 can be used for training of a machine learning model that collects a content or a segment to which a specific impression identification label (for example, "joyful", "sad", or the like) is assigned from the massive amount of video contents 101, generates a content that gives the specific impression, or estimates a camera operation for capturing an impressing content.

G-3. Support or Control of Camerawork

It is possible to support or automatically control the camerawork on the basis of a result obtained by inputting a content captured by the digital camera 500 to the impression identifier. For example, in order to increase the degree of being impressed or in order to acquire a specific type of impression identification label, a line-of-sight direction and zooming for imaging a subject may be automatically controlled, a luminance, a color, an angle of view, a composition, a focus, or the like of a captured image may be automatically controlled, or a recommended angle may be given using guidance display on the display unit 516 or voice guidance from the sound reproducing unit 517.

Figure 7:
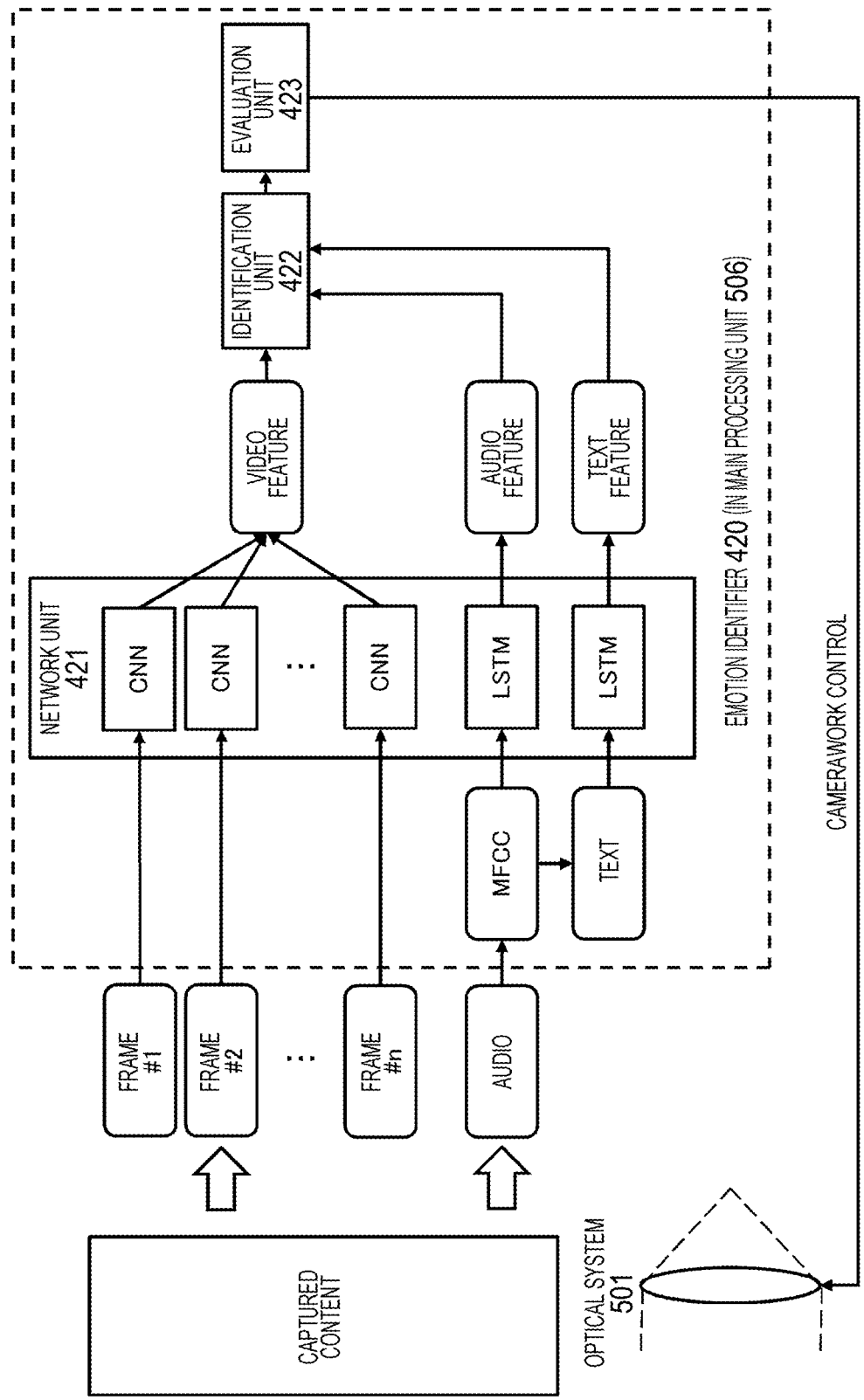
FIG. 7 is a diagram illustrating a functional configuration of the digital camera 500 for automatically controlling camerawork on the basis of an impression identification result of a captured content.

FIG. 7 illustrates a functional configuration of the digital camera 500 for automatically controlling the camerawork on the basis of an impression identification result of a captured content. In the drawing, the configuration of the impression identifier 420 is the same as that illustrated in FIG. 4. It is assumed that the impression identifier 420 operates in the main processing unit 506 in the digital camera 500.

In a video of a content captured by the digital camera 500, respective features are acquired through the trained neural network model (CNN) in the network unit 421 for each frame, and the features are organized to obtain the video feature. Furthermore, audio data recorded in synchronization with the video is converted into a feature such as MFCC and input to a time-series network such as an LSTM in the network unit 421, whereby the audio feature is obtained. In addition, the text feature can be obtained by transcribing a feature of a speech into a text and inputting the text feature into a time-series network such as an LSTM in the network unit 421.

The identification unit 422 projects the video feature, the audio feature, and the text feature obtained as described above to the common space, and assigns the impression identification label to the learning data input to the impression identifier 420. Then, the evaluation unit 423 outputs a control signal for the camerawork to the optical system 501 so that the degree of being impressed increases or a specific type of impression identification label can be acquired.

G-4. Addition of Caption

It is possible to automatically add a caption that is appropriate for a scene of a video and that increases the degree of being impressed on the basis of a result obtained by inputting a content captured by the digital camera 500 to the impression identifier.

Figure 8:
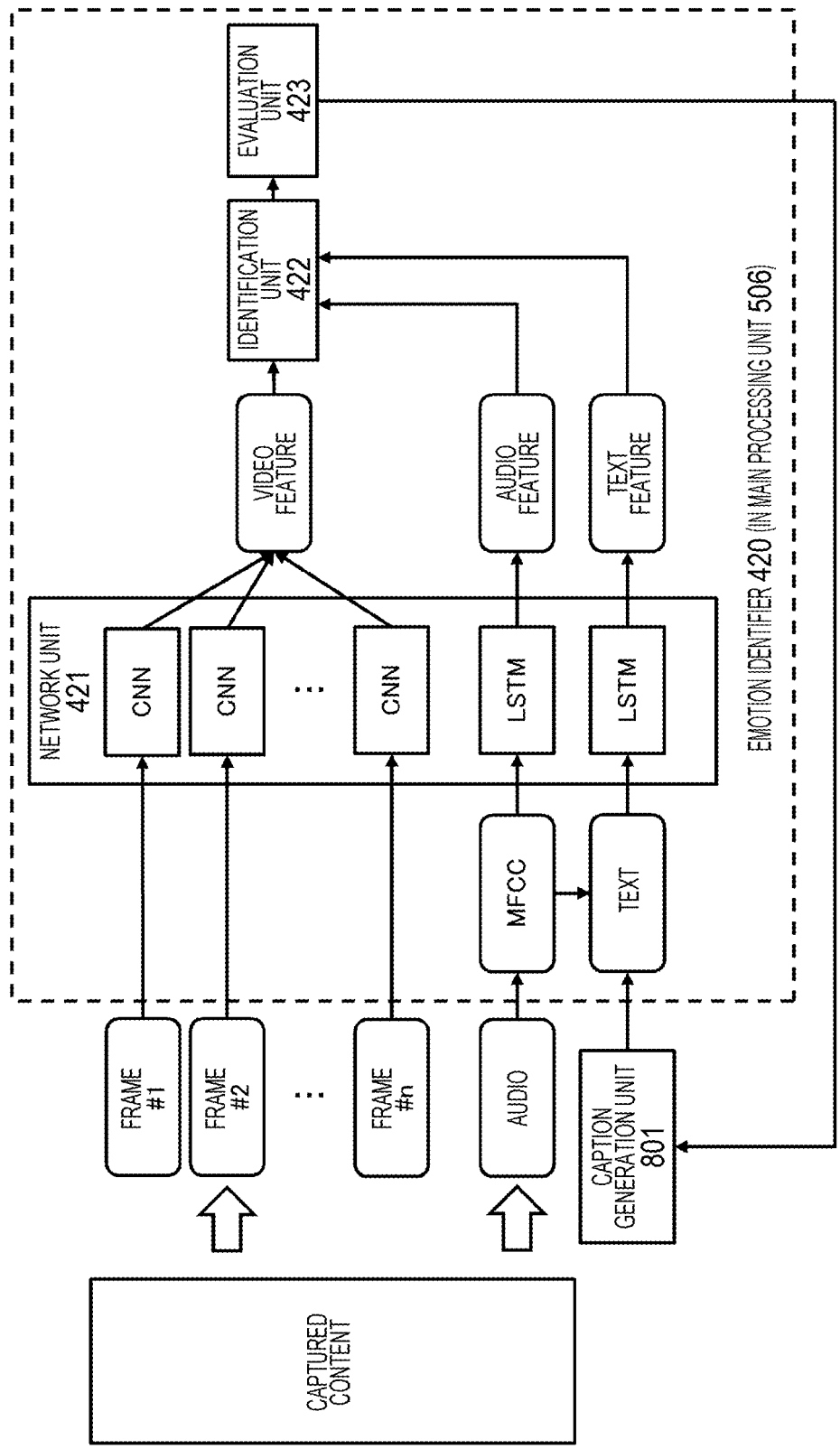
FIG. 8 is a diagram illustrating a functional configuration of the digital camera 500 for automatically generating a caption on the basis of an impression identification result of a captured content.

FIG. 8 illustrates a functional configuration of the digital camera 500 for automatically generating a caption on the basis of an impression identification result of a captured content. In the drawing, the configuration of the impression identifier 420 is the same as that illustrated in FIG. 4. It is assumed that the impression identifier 420 operates in the main processing unit 506 in the digital camera 500.

In a video of a content captured by the digital camera 500, respective features are acquired through the trained neural network model (CNN) in the network unit 421 for each frame, and the features are organized to obtain the video feature. Furthermore, audio data recorded in synchronization with the video is converted into a feature such as MFCC and input to a time-series network such as an LSTM in the network unit 421, whereby the audio feature is obtained. In addition, the text feature can be obtained by transcribing a feature of a speech into a text and inputting the text feature into a time-series network such as an LSTM in the network unit 421. Furthermore, a caption generation unit 801 generates a caption for each scene by using, for example, a trained machine-learned model. Text information of a caption generated by the caption generation unit 801 is superimposed on text information obtained from speech recognition performed on a content and is input to a time-series network such as an LSTM in the network unit 421.

The identification unit 422 projects the video feature, the audio feature, and the text feature obtained as described above to the common space, and assigns the impression identification label to the learning data input to the impression identifier 420. The evaluation unit 423 calculates a loss function for the impression identification label output from the identification unit 422. Then, the caption generation unit 801 performs relearning in such a way that the degree of being impressed increases or a specific type of impression identification label can be acquired. A caption generated by the caption generation unit 801 is recorded while being superimposed on speech data of a content.

G-5. Addition of Background Music

It is possible to automatically add background music that is appropriate for a scene of a video and that increases the degree of being impressed on the basis of a result obtained by inputting a content captured by the digital camera 500 to the impression identifier.

Figure 9:
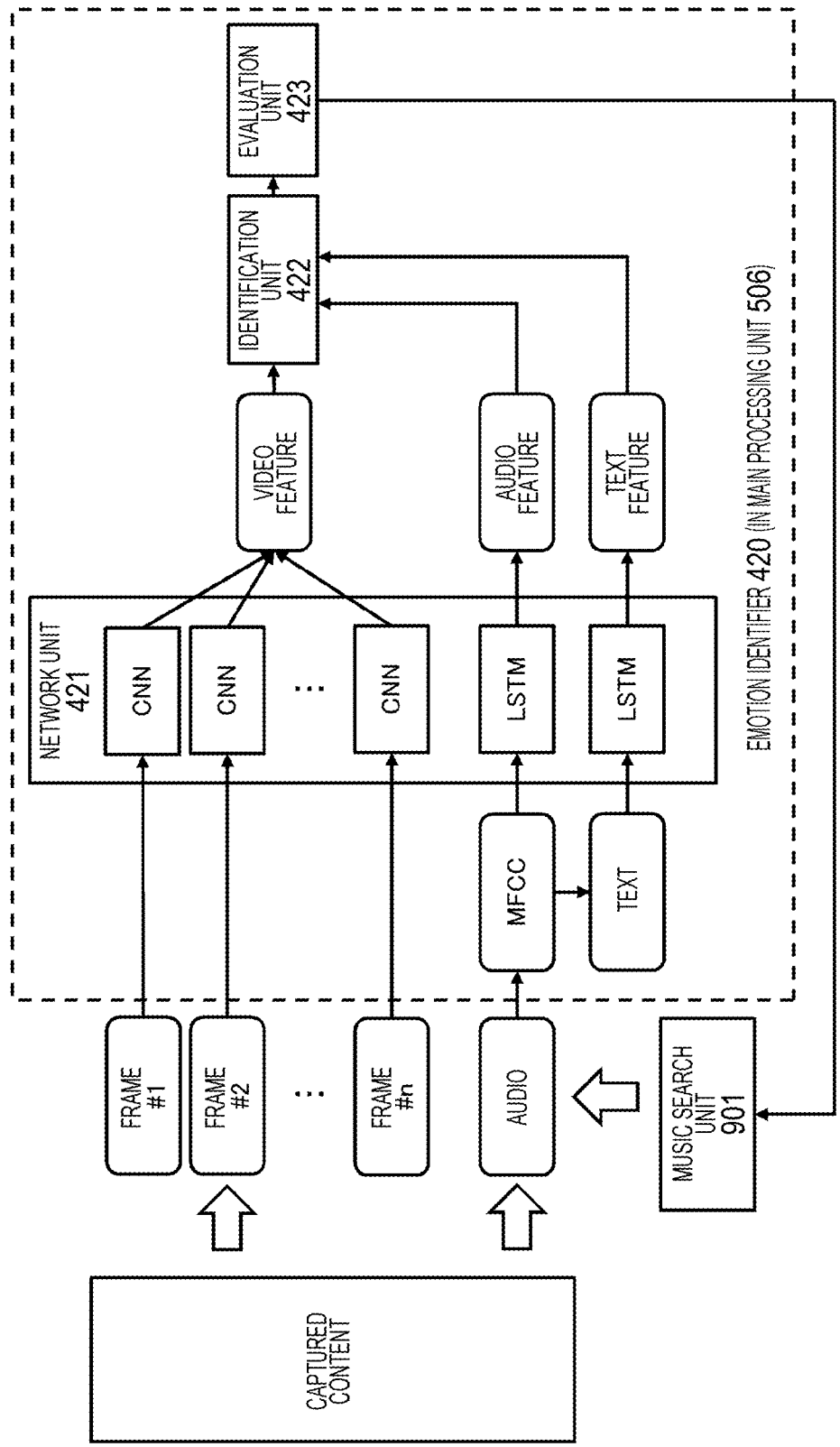
FIG. 9 is a diagram illustrating a functional configuration of the digital camera 500 for automatically adding background music on the basis of an impression identification result of a captured content.

FIG. 9 illustrates a functional configuration of the digital camera 500 for automatically adding background music on the basis of an impression identification result of a captured content. In the drawing, the configuration of the impression identifier 420 is the same as that illustrated in FIG. 4. It is assumed that the impression identifier 420 operates in the main processing unit 506 in the digital camera 500.

In a video of a content captured by the digital camera 500, respective features are acquired through the trained neural network model (CNN) in the network unit 421 for each frame, and the features are organized to obtain the video feature. Furthermore, audio data recorded in synchronization with the video is converted into a feature such as MFCC and input to a time-series network such as an LSTM in the network unit 421, whereby the audio feature is obtained. In addition, the text feature can be obtained by transcribing a feature of a speech into a text and inputting the text feature into a time-series network such as an LSTM in the network unit 421. Furthermore, a music search unit 901 searches for music to be background music of a scene by using, for example, a trained machine-learned model. For example, the music search unit 901 may search a music database (not illustrated) in which a massive amount of music data is accumulated for music to be background music of a scene. Music data of the music found by the music search unit 901 is superimposed on audio data of the content and input to a time-series network such as an LSTM in the network unit 421.

The identification unit 422 projects the video feature, the audio feature, and the text feature obtained as described above to the common space, and assigns the impression identification label to the learning data input to the impression identifier 420. The evaluation unit 423 calculates a loss function for the impression identification label output from the identification unit 422. Then, the music search unit 901 performs relearning in such a way as to find background music that can increases the degree of being impressed or acquire a specific type of impression identification label. The music data of the music found by the music search unit 901 is recorded while being superimposed on the audio data of the content.

H. Efficient Training of Model

As described in the above section G, according to the present disclosure, as the neural network model is mounted on the digital camera 500, it is possible to assign the impression identification label indicating a level of impression to a content (alternatively, each segment included in a content), support or control the camerawork (automatic operation of the camera) for capturing a content that can give a high level of impression, and add a caption or background music for improving an impression score of a content. In this section H, a method for efficiently training the neural network model in the digital camera 500 will be described.

Note that, although only a description of a method of training a neural network model for the automatic operation of the camera is provided for convenience of explanation, it should be understood that training can be efficiently performed by a similar method also for a neural network model for adding a caption or adding background music.

H-1. Configuration of Training System

Figure 10:
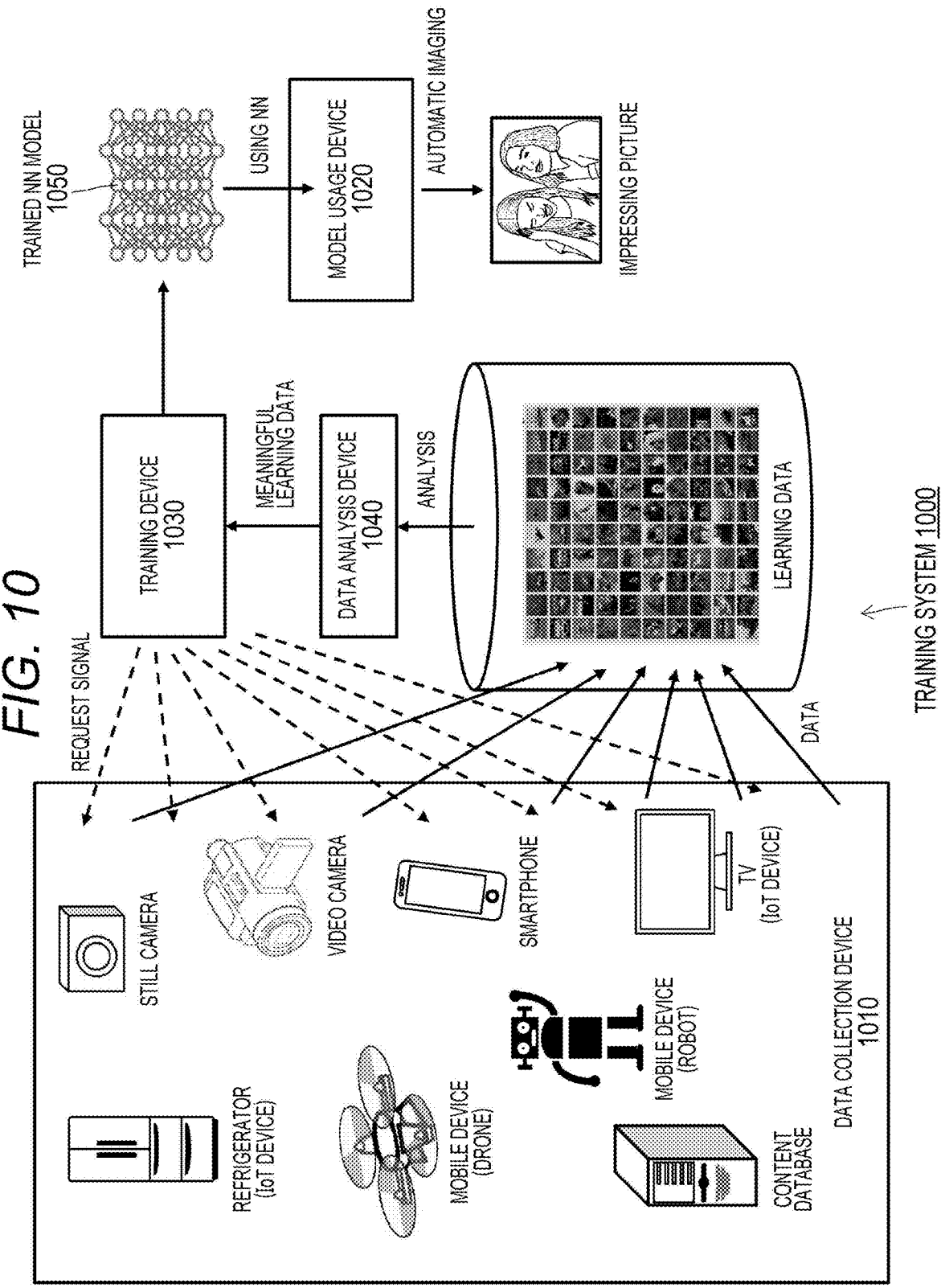
FIG. 10 is a diagram illustrating a configuration of a training system 1000 for efficiently training a neural network model for automatic operation of a camera.

FIG. 10 schematically illustrates a configuration of a training system 1000 for efficiently training a neural network model for camera operation support and automatic operation. In the present embodiment, a neural network model that estimates a camera operation for generating an impressing content or capturing an impressing content is mainly assumed as a training target neural network model. It is a matter of course that the training system 1000 can also be used for training other types of neural network models.

The training system 1000 illustrated in FIG. 10 includes a data collection device 1010 that collects learning data, a training device 1030 that trains a neural network model on the basis of the learning data collected by the data collection device 1010, a data analysis device 1040 that performs analysis related to the learning data, and a model usage device 1020 that uses a neural network model 1050 trained by the training device 1030.

The data collection device 1010 collects data including, for example, image data captured by a camera, operation information at the time of capturing an image by the camera, and the like. The data collection device 1010 includes a large number of types of devices such as a still camera, a video camera, an image sensor used in a camera, a multifunctional information terminal such as a smartphone, a television, a headphone or earphone, a game machine, an IoT device such as a refrigerator or a washing machine, and a mobile device such as a drone or a robot, and can collect a massive amount of data from the large number of data collection devices 1010. For example, in a case where the data collection device 1010 is a camera used by an expert such as a professional photographer, it is possible to collect an impressing captured image and camera operation information for capturing such an image. Furthermore, the data collection device 1010 may include not only a device that collects data in real time as exemplified above but also a device in which a large amount of data is already accumulated like a content database.

The training device 1030 transmits a request signal for requesting each data collection device 1010 to transmit collected data. It is a matter of course that the data collection device 1010 may voluntarily transmit data instead of transmitting data in response to the request signal. Then, the training device 1030 performs training and re-training of various neural network models such as an "observation prediction model", an "operation model", an "operation estimation model", and an "impression score estimation model" by using the massive amount of data collected by the large number of data collection devices 1010. Details of the neural network model used in the training system 1000 will be described later.

Although the accuracy in training the neural network model is improved by using a massive amount of data, it is inefficient to perform training and re-training by using data that does not contribute much to training. Therefore, in the training system 1000 according to the present disclosure, the data analysis device 1040 analyzes learning data that affects the training of the training target neural network model, and extracts, on the basis of the analysis result, meaningful learning data such as learning data that affects training of a neural network model to a predetermined degree or more, insufficient learning data, or data similar thereto. The training device 1030 efficiently trains and re-trains the neural network model by using the meaningful learning data extracted by the data analysis unit 1040.

The data analysis device 1040 can analyze data collected by the data collection device 1010 on the basis of, for example, a method such as explainable AI (XAI), confidence score calculation of learning data, influence function calculation, or data shortage estimation by a Bayesian deep neural network (DNN).

The model usage device 1020 is a device that captures an impressing content by using the neural network model 1050 trained by the training device 1030. The model usage device 1020 is, for example, a camera used by a general user who is not accustomed to camera operation. The model usage device 1020 can perform automatic operation of the camera comparable to an expert in photographing such as a professional photographer, and can automatically capture a video having a high impression score by using the neural network model trained by the training device 1030.

Here, a modified example of the training system 1000 will be described.

The training device 1030 requires a massive amount of calculation resources to train various neural network models. Therefore, it is assumed in FIG. 10 that the training device 1030 is constructed on, for example, the cloud (that is, cloud artificial intelligence (AI)). Furthermore, the training device 1030 may perform distributed training by using a plurality of calculation nodes. However, it is also assumed that the training device 1030 is configured integrally with a model usage device using a trained neural network model (that is, edge AI). Alternatively, the training device 1030 may be configured integrally with the data collection device 1010 that provides the learning data.

In addition, the data analysis device 1040 may be constructed on either the cloud or the edge. For example, the data analysis device 1040 may be implemented as a device integrated with the training device 1030. In this case, the training device 1030 may analyze learning data that affects the training of the neural network model therein, and request the data collection device 1010 to transmit learning data that affects training of a neural network model to a predetermined degree or more, insufficient learning data, or data similar thereto.

Alternatively, the data analysis device 1040 may be implemented as a device integrated with the data collection device 1010. In this case, the training device 1030 provides information necessary for data analysis (for example, information of the neural network model trained at that time) to the data collection device 1010 at the time of requesting transmission of the learning data or the like. Then, the data collection device 1010 may analyze an influence of the collected data on the neural network model, and transmit, to the training device 1030, learning data that affects training of the neural network model to a predetermined degree or more, insufficient learning data, or data similar thereto among the collected data.

Furthermore, in FIG. 10, the data collection device 1010 that collects the learning data and the model usage device 1020 that uses the neural network model are illustrated as separate devices, but it is also assumed that one device operates as both the data collection device 1010 and the model usage device 1020. For example, one camera may operate as the data collection device 1010 to collect data such as imaging data and camera operation information and transmit the data to the training device 1030 in a manual operation mode, and may operate as the model usage device 1020 to perform automatic imaging by using the neural network model trained by the training device 1030 once switching to an automatic operation mode is made.

H-2. Configuration of Neural Network Model

The neural network model used in the training system 1000 illustrated in FIG. 10 will be described. In the training system 1000, the training device 1030 performs training and re-training of a neural network such as the "observation prediction model", the "operation model", the "operation estimation model", and the "impression score estimation model" by using data collected by the data collection device 1040. In addition, the model usage device 1020 uses at least some of these neural network models trained by the training device 1030.

Figure 11:
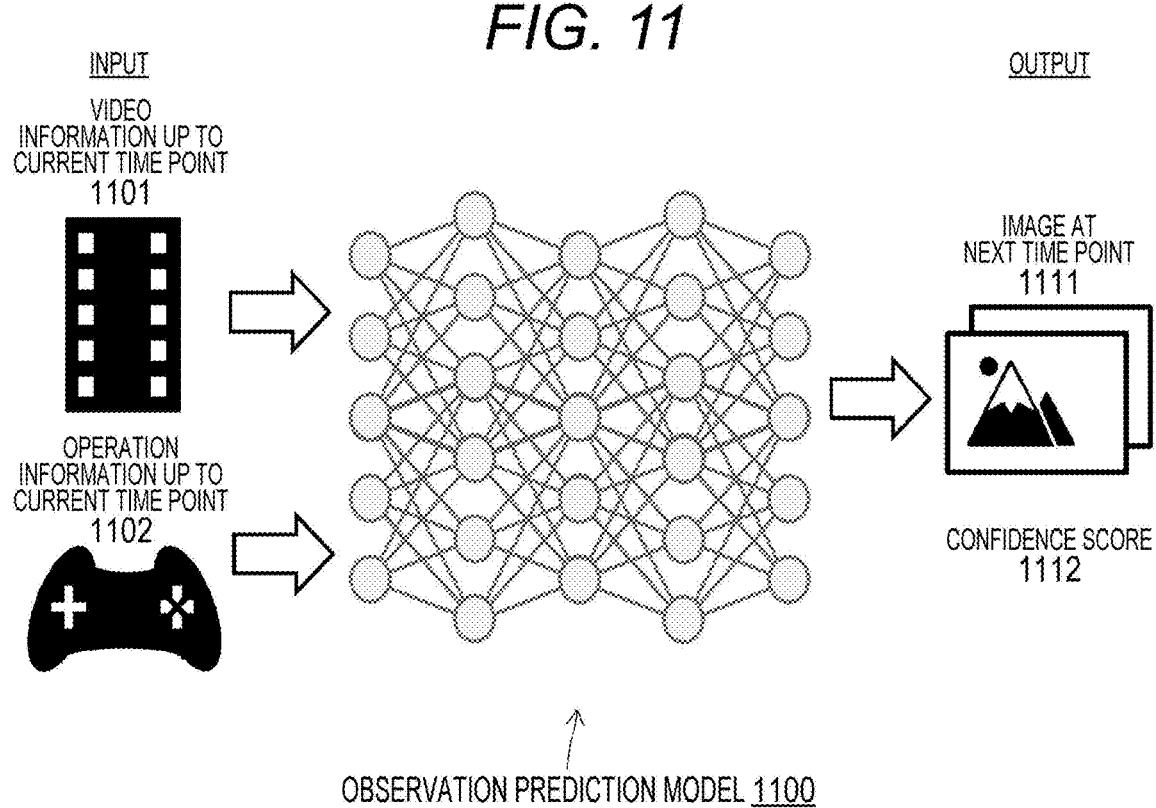
FIG. 11 is a diagram illustrating a configuration of an observation prediction model 1100.

Observation Prediction Model:

FIG. 11 schematically illustrates a configuration of an observation prediction model 1100. The observation prediction model 1100 is a neural network model that predicts an image (that is, an "image at the next time point") 1111 captured by the camera at the next time point on the basis of video information 1101 up to the current time point captured by the camera and operation information 1102 for the camera up to the current time point.

The operation information 1102 referred to herein is, for example, information regarding an operation performed on the camera for determining imaging conditions such as a frame rate, an aperture, an exposure value, a magnification, and a focus (hereinafter, the same applies). Furthermore, in a case where the camera is mounted on a mobile device such as a robot or a drone, the operation information may also include a remote controller operation (for example, camerawork indicated by rolling, pitching, or yawing) performed on the mobile device (hereinafter, the same applies).

Furthermore, the observation prediction model 1100 also outputs a confidence score 1112 for the predicted image 1111 at the next time point. The confidence score 1112 is a value indicating how accurately the image 1111 at the next time point can be predicted. In the present disclosure, the confidence score is used to identify insufficient data for the training or data that affects the training to a high degree. Alternatively, the data analysis device 1040 extracts meaningful learning data such as learning data that affects the training of the observation prediction model 1100 to a predetermined degree or more, insufficient learning data, or data similar thereto on the basis of a method such as explanation of the grounds of prediction of the observation prediction model 1100 by XAI, confidence score calculation, influence function calculation, and data shortage estimation by a Bayesian DNN. A function of calculating the confidence score 1112 by the observation prediction model 1100 may be implemented as a part of the data analysis device 1040.

In the training system 1000, the training device 1030 can train the observation prediction model 1100 on the basis of a data set including the video information and the operation information transmitted from the data collection device 1010. The training device 1030 can train the observation prediction model 1100 in such a way that a more impressing image can be predicted by reinforcement learning. In addition, the data analysis device 1040 extracts meaningful learning data from the data set transmitted from the data collection device 1010, and the training device 1030 can efficiently perform retraining of the observation prediction model 1100 by using the meaningful learning data.

Figure 12:
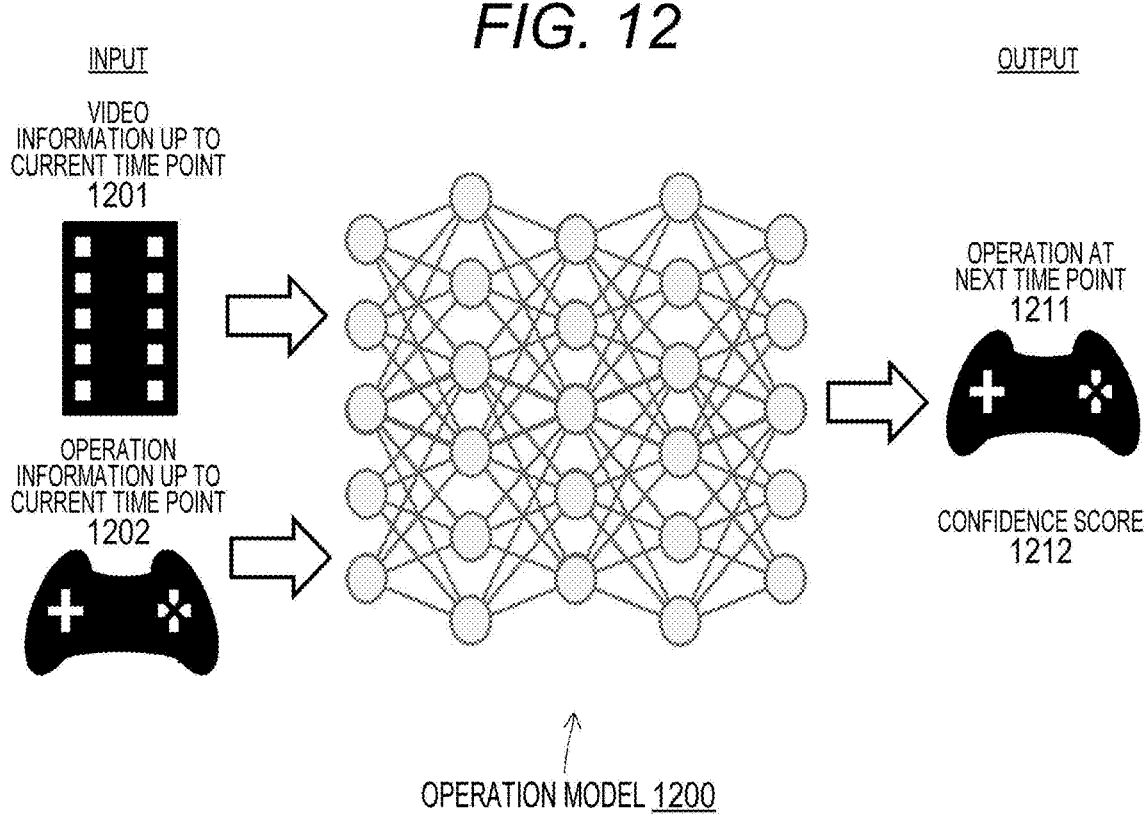
FIG. 12 is a diagram illustrating a configuration of an operation model 1200.

Operation Model:

FIG. 12 schematically illustrates a configuration of an operation model 1200. The operation model 1200 is a neural network model that predicts an operation 1211 to be performed on the camera at the next time point on the basis of video information 1201 up to the current time point captured by the camera and operation information 1202 for the camera up to the current time point. Furthermore, the operation model 1200 also outputs a confidence score 1212 for the predicted operation 1211 at the next time point. The confidence score 1212 is a value indicating how accurately the image 1111 at the next time point can be predicted. Alternatively, the data analysis device 1040 extracts meaningful learning data such as learning data that affects the training of the operation model 1200 to a predetermined degree or more, insufficient learning data, or data similar thereto on the basis of a method such as explanation of the grounds of prediction of the operation model 1200 by XAI, confidence score calculation, influence function calculation, and data shortage estimation by a Bayesian DNN. A function of calculating the confidence score 1212 by the operation model 1200 may be implemented as a part of the data analysis device 1040.

In the training system 1000, the training device 1030 can train the operation model 1200 on the basis of a data set including the video information and the operation information transmitted from the data collection device 1010. The training device 1030 can train the operation model 1200 in such a way that camera operation information that enables capturing of a more impressing image can be predicted by reinforcement training. In addition, the data analysis device 1040 extracts meaningful learning data from the data set transmitted from the data collection device 1010, and the training device 1030 can efficiently perform retraining of the operation model 1200 by using the meaningful learning data.

Figure 13:
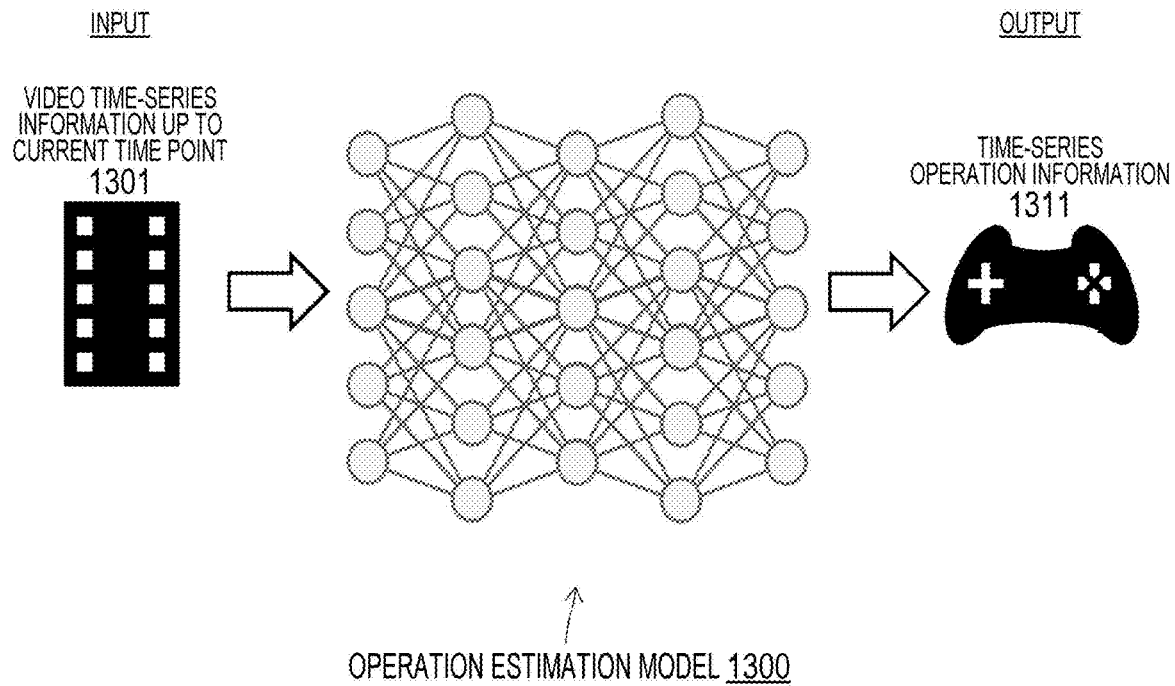
FIG. 13 is a diagram illustrating a configuration of an operation estimation model 1300.

Operation Estimation Model:

FIG. 13 schematically illustrates a configuration of an operation estimation model 1300. The operation estimation model 1300 is a neural network model that estimates time-series operation information 1311 for capturing video time-series information 1301 up to the current time point with the camera. For example, the operation estimation model 1300 can be used to estimate information regarding a time-series operation of the camera performed by an expert who is familiar with camera operation such as a professional photographer, on the basis of high-quality video time-series information captured by the expert.

The operation estimation model 1300 may also output a confidence score for the estimated time-series operation information 1311. Alternatively, the data analysis device 1040 extracts meaningful learning data such as learning data that affects the training of the operation estimation model 1300 to a predetermined degree or more, insufficient learning data, or data similar thereto on the basis of a method such as explanation of the grounds of prediction of the operation estimation model 1300 by XAI, confidence score calculation, influence function calculation, and data shortage estimation by a Bayesian DNN. A function of calculating the confidence score by the operation estimation model 1300 may be implemented as a part of the data analysis device 1040.

In the training system 1000, the training device 1030 can train the operation estimation model 1300 on the basis of a data set including the video information and the operation information transmitted from the data collection device 1010. The training device 1030 can train the operation estimation model 1300 in such a way as to be able to predict the time-series operation information that enables capturing of a more impressing image by reinforcement learning. In addition, the data analysis device 1040 extracts meaningful learning data from the data set transmitted from the data collection device 1010, and the training device 1030 can efficiently perform retraining of the operation estimation model 1300 by using the meaningful learning data.

Figure 14:
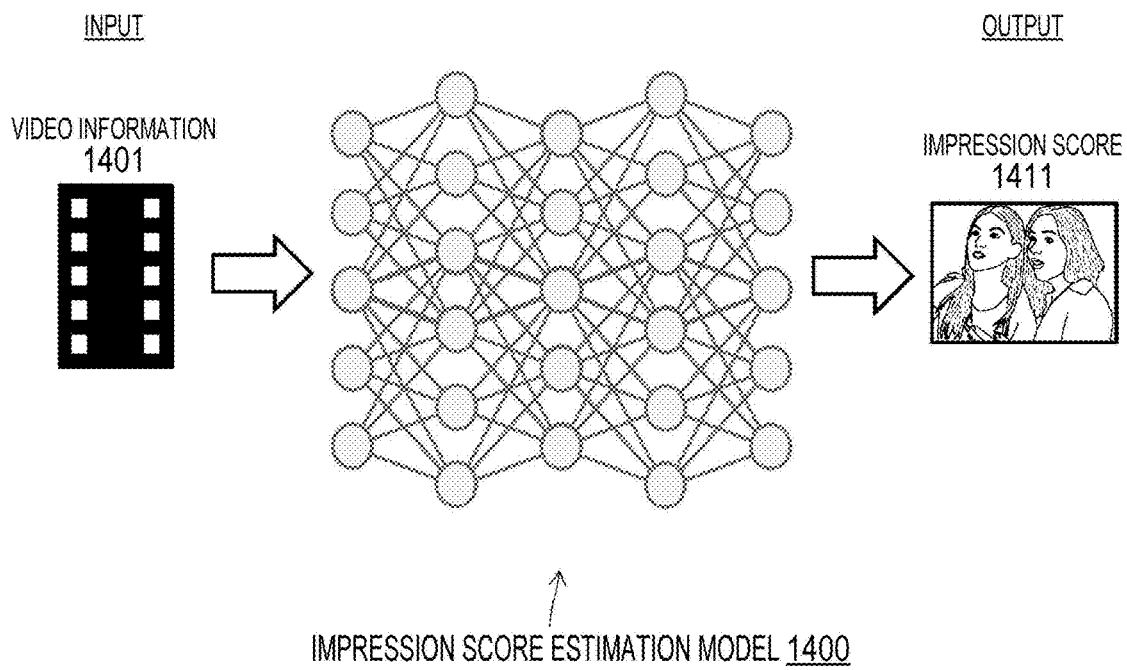
FIG. 14 is a diagram illustrating an impression score estimation model 1400.

Impression Score Estimation Model:

FIG. 14 schematically illustrates a configuration of an impression score estimation model 1400. The impression score estimation model 1400 is a neural network model that estimates an impression score 1411 of video information 1401, and corresponds to the emotion identifier described above. For example, the impression score estimation model 1400 can be trained according to the training process illustrated in FIG. 4.

Figure 15:
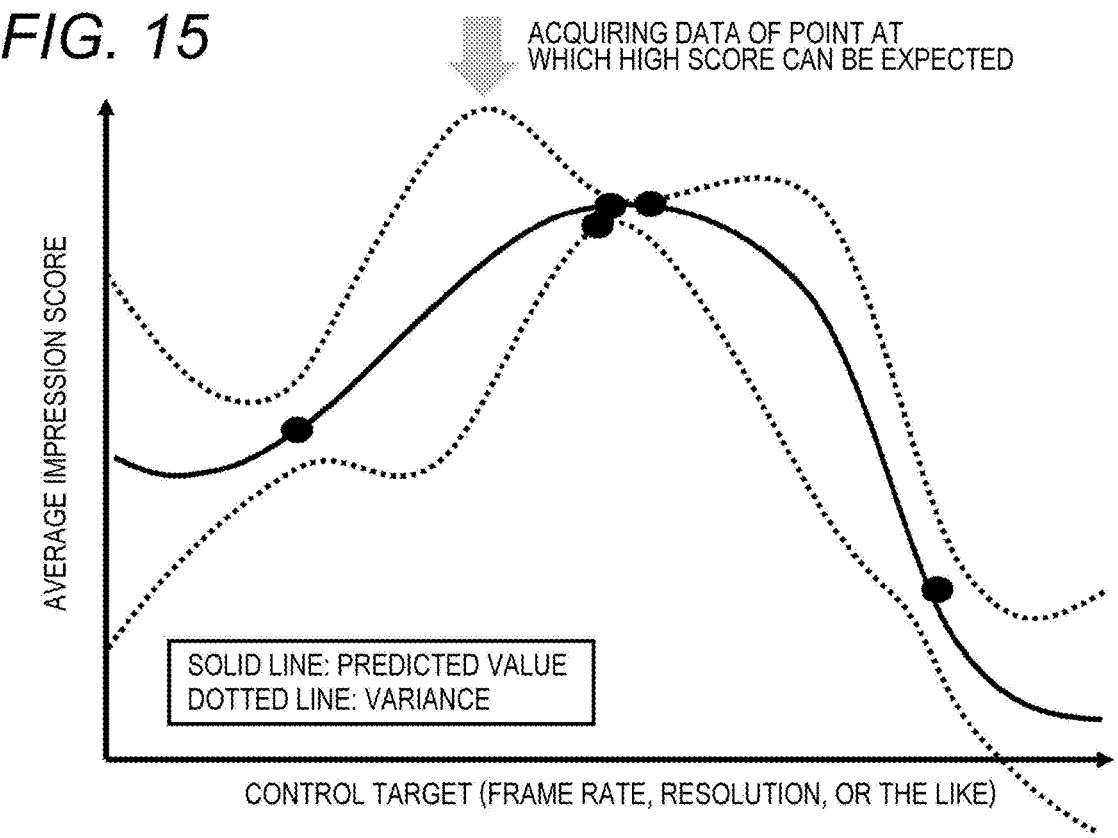
FIG. 15 is a diagram illustrating a relationship between a control target and an average impression score.

FIG. 15 illustrates a relationship between a control target (a frame rate, a resolution, or the like) and an average impression score. However, a predicted value output from the neural network model is indicated by a solid line, and the variance is indicated by dots. FIG. 15 illustrates an average impression score obtained in a case where the operation model is trained by reinforcement learning in such a way that the impression score becomes high on the basis of video data acquired at a certain frame rate and the camera is operated using the trained operation model. In the drawing, a data point indicated by a black circle is a point already having data. A variance for a point having data is small. A variance for a point having no data is large. A point for which a variance is larger and at which a higher score can be expected is worth observation. For example, it is conceivable to acquire data of a point at which the highest score can be expected by optimistically considering the variance.

The impression score estimation model 1400 may also output a confidence score for the estimated impression score 1411. Alternatively, the data analysis device 1040 extracts meaningful learning data such as learning data that affects the training of the impression score estimation model 1400 to a predetermined degree or more, insufficient learning data, or data similar thereto on the basis of a method such as explanation of the grounds of prediction of the impression score estimation model 1400 by XAI, confidence score calculation, influence function calculation, and data shortage estimation by a Bayesian DNN. A function of calculating the confidence score by the impression score estimation model 1400 may be implemented as a part of the data analysis device 1040.

In the training system 1000, the training device 1030 can train the impression score estimation model 1400 on the basis of a data set including the video information and the operation information transmitted from the data collection device 1010. The training device 1030 can train the impression score estimation model 1400 in such a way that a higher impression score can be estimated for a more impressing video information by reinforcement learning. In addition, the data analysis device 1040 extracts meaningful learning data from the data set transmitted from the data collection device 1010, and the training device 1030 can efficiently perform retraining of the impression score estimation model 1400 by using the meaningful learning data.

H-3. Analysis of Learning Data

In the training system 1000, the data analysis device 1040 analyzes the learning data of the neural network model to be trained and specifies meaningful learning data such as learning data that affects the training to a predetermined degree or more, insufficient learning data, or data similar thereto, and the training device 1020 performs efficient training and re-training of the neural network model by using such meaningful learning data.

The data analysis device 1040 may be constructed on either the cloud or the edge. For example, the data analysis device 1040 may be implemented as a device integrated with the training device 1030. In this case, the training device 1030 analyzes learning data that affects the training of the neural network model therein, and requests the data collection device 1010 to transmit learning data that affects the training of the neural network model to a predetermined degree or more, insufficient learning data, or data similar thereto.

Alternatively, the data analysis device 1040 may be implemented as a device integrated with the data collection device 1010. In this case, the training device 1030 provides information necessary for data analysis (for example, information of the neural network model trained at that time) to the data collection device 1010 at the time of requesting transmission of the learning data or the like. Then, the data collection device 1010 analyzes an influence of the collected data on the neural network model, and transmits, to the training device 1030, learning data that affects the training of the neural network model to a predetermined degree or more, insufficient learning data, or data similar thereto among the collected data.

Examples of a method of analyzing data by the data analysis device 1040 include XAI, confidence score calculation of learning data, influence function calculation, and data shortage estimation by a Bayesian DNN.

The confidence score is a numerical value of the degree of correctness of the predicted value from the neural network model. Among the neural network models described above, the observation prediction model 1100 and the operation model 1200 are configured to output the confidence score together with the predicted value.

In the training system 1000, the data collection device 1010 filters learning data to be transmitted to the training device 1030 by using the confidence score, which will be described later in detail.

There are several methods of calculating the confidence score which is a value output from the neural network model, and the present disclosure is not limited to a specific calculation method. Here, three types of confidence score calculation methods (1) to (3) will be described.

(1) Neural Network Model Trained to Estimate Error of Output

Figure 16:
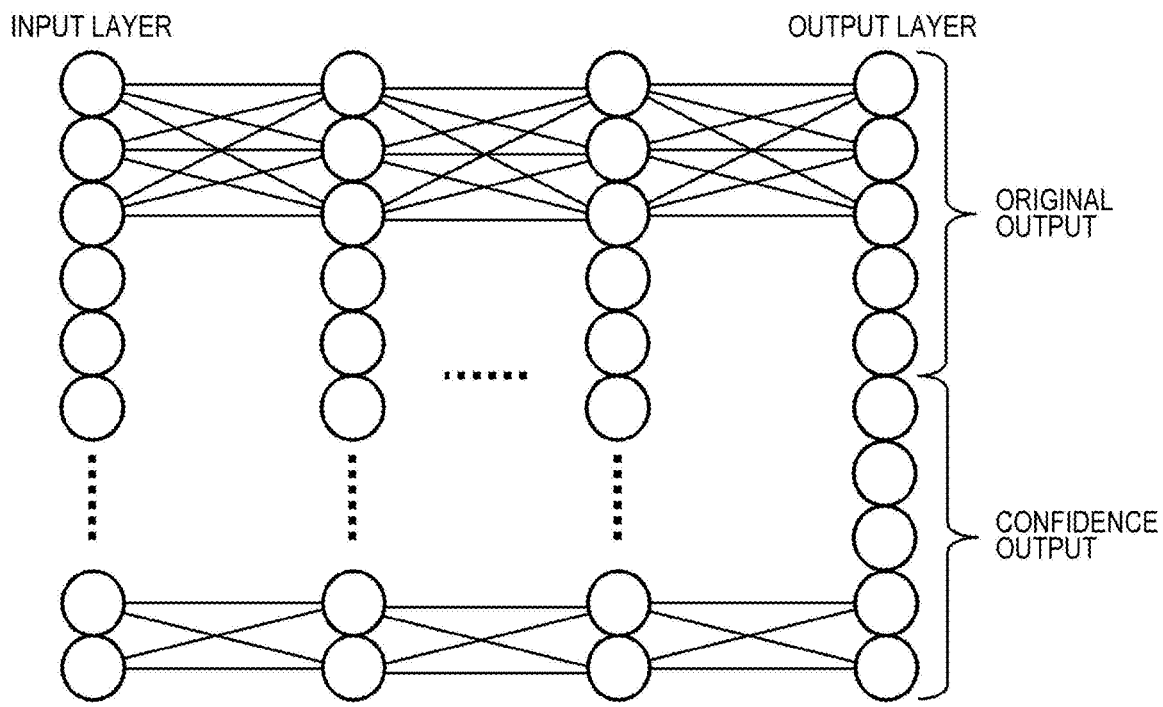
FIG. 16 is a diagram illustrating a neural network model trained to estimate an error of an output.

As illustrated in FIG. 16, in a neural network model 1500, training is performed in such a way as to output, together with an original output, an error of the output as the confidence score.

(2) Method Using Bayesian Estimation

Perturbation is applied to input data and a configuration of an intermediate neuron by using random numbers such as image augmentation and dropout, and training is performed in such a way that correct prediction can be made even under the perturbation. At the time of inference, estimation is performed many times while applying perturbation. The larger the variance for the result, the lower the confidence score.

(3) Method Using Prediction Probability (in Case of Classification Problem)

In a case of a classification problem for which a prediction probability is 0.0 to 1.0, it can be determined that the confidence score is high in a case where a result such as 0.0 or 1.0 is obtained, it can be determined that the confidence score is 0.5 (close to 50%) in a case of binary classification, and it can be determined that the confidence score is low in a case where a probability of a class with the highest probability is low in a case of other class classification.

In addition, an influence function is obtained by formulating an influence of the presence or absence of each piece of learning data and perturbation on a prediction result of the neural network model (see, for example, Non-Patent Document 4). Furthermore, the Bayesian DNN is configured by combining Bayesian estimation and deep learning, and it is possible to evaluate uncertainty due to data shortage when the neural network model outputs a prediction result by using the Bayesian estimation.

H-4. Configuration of Data Collection Device

The data collection device 1010 is various types of devices such as a still camera, a video camera, an image sensor used in a camera, a multifunctional information terminal such as a smartphone, a television, a headphone or earphone, a game machine, an IoT device such as a refrigerator or a washing machine, and a mobile device such as a drone or a robot.

Figure 17:
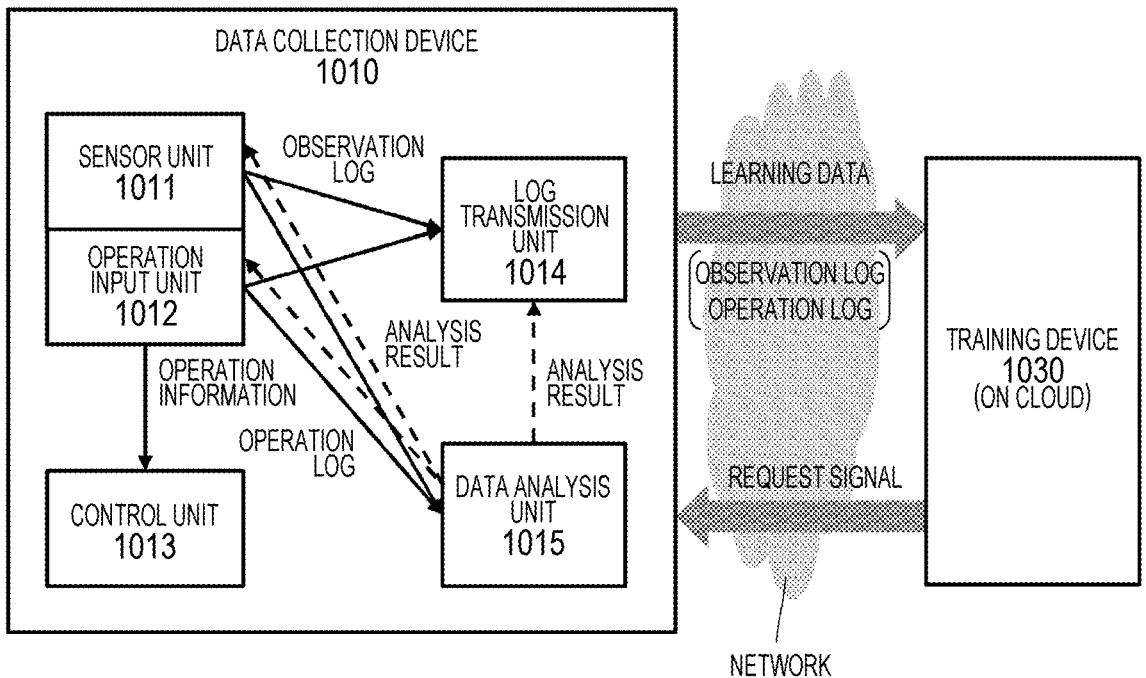
FIG. 17 is a diagram illustrating an internal configuration example of a data collection device 1010.

FIG. 17 illustrates an internal configuration example of the data collection device 1010. The data collection device 1010 illustrated in FIG. 17 includes a sensor unit 1011, an operation input unit 1012, a control unit 1013, a log transmission unit 1014, and a data analysis unit 1015. However, FIG. 17 depicts an abstracted representative functional configuration related to implementation of the present disclosure among various types of data collection devices 1010, and it is assumed that each data collection device 1010 includes various components (not illustrated).

The sensor unit 1011 includes an image sensor including a CMOS or the like and other sensors provided in the data collection device 1010, and performs observation including capturing of images and videos. In addition, in a case where the data collection device 1010 is mounted on a mobile device such as a robot or a drone, various sensors mounted on the mobile device such as an inertial measurement unit (IMU) are also included in the sensor unit 1011.

The operation input unit 1012 is a functional module that performs an input operation for adjusting operation information such as an imaging condition in the data collection device 1010. The operation input unit 1012 includes an operating element such as a button or a knob, a touch panel screen, and the like. In addition, in a case where the data collection device 1010 is mounted on a mobile device such as a robot or a drone, a remote controller used for remotely operating the mobile device is also included in the operation input unit 1012.

The control unit 1013 integrally controls the operation of the entire data collection device 1010. Furthermore, the control unit 1013 controls observation in which an image or a video is captured in the sensor unit 1011 on the basis of operation information input via the operation input unit 1012.

The log transmission unit 1014 transmits, to the training device 1030, a data set including an observation log of the sensor unit 1011 and an operation log input to the operation input unit 1012. Basically, the log transmission unit 1014 transmits the data set to the training device 1030 in response to reception of a request signal for requesting data transmission from the training device 103. The data collection device 1010 newly collects data in response to the reception of the request signal from the training device 1030 and transmits the data to the training device 1030. However, data extracted from the already collected data on the basis of the request signal may also be transmitted to the training device 1030. It is a matter of course that the data collection device 1010 may voluntarily transmit data instead of transmitting data in response to the request signal.

The data analysis unit 1015 analyzes an influence of the data set including the observation log of the sensor unit 1011 and the operation log input to the operation input unit 1012 on training of each neural network model to be trained, and specifies whether or not the data set is meaningful data for the training, such as learning data that affects the training to a predetermined degree or more, insufficient learning data, or data similar thereto.

There are a case where a request signal in which meaningful data for the training is designated is transmitted from the training device 1030, and a case where a request signal instructing analysis of collected data is transmitted. In the former case, the data analysis unit 1015 checks whether or not the data set including the observation log of the sensor unit 1011 and the operation log input to the operation input unit 1012 corresponds to the data designated in the request signal, and the log transmission unit 1014 transmits only data conforming to the request to the training device 1030.

Furthermore, in the latter case, the data analysis unit 1015 corresponds to the data analysis device 1040 in FIG. 10. The data analysis unit 1015 in this case analyzes learning data that affects training of a neural network model to be trained in the training device 1030, and checks whether or not the data set including the observation log of the sensor unit 1011 and the operation log input to the operation input unit 1012 corresponds to meaningful learning data such as learning data that affects training of the neural network model to a predetermined degree or more, insufficient learning data, or data similar thereto. Then, the log transmission unit 1014 transmits, to the training device 1030, only a data set corresponding to meaningful learning data. The data analysis unit 1015 analyzes the neural network model by using, for example, at least one of XAI, the confidence score, the influence function, or the Bayesian DNN, or a combination of two or more thereof. For example, in a case where the data analysis unit 1015 analyzes data by using the confidence score, information of the neural network model trained up to the current time point is received from the training device 1030, and the confidence score in the inference made by the neural network model when the data set is input is calculated. A method of calculating the confidence score is described in section H-3 above. Further, it can be said that the observation log and the operation log with a high confidence score are not insufficient learning data and are low in value, but the observation log and the operation log with a low confidence score are insufficient learning data and are high in value. As insufficient learning data with a low confidence score is provided to the training device 1030, the training device 103 can efficiently perform training and re-training of the neural network model.

In addition, the data analysis unit 1015 may feed back the analysis result to the sensor unit 1011 and the operation input unit 1012. Then, the sensor unit 1011 and the operation input unit 1012 may perform imaging by changing the resolution, the frame rate, the luminance, the color, the angle of view, the viewpoint position, or the line-of-sight direction on the basis of the degree of influence on the training of the neural network model to be trained.

Figure 18:
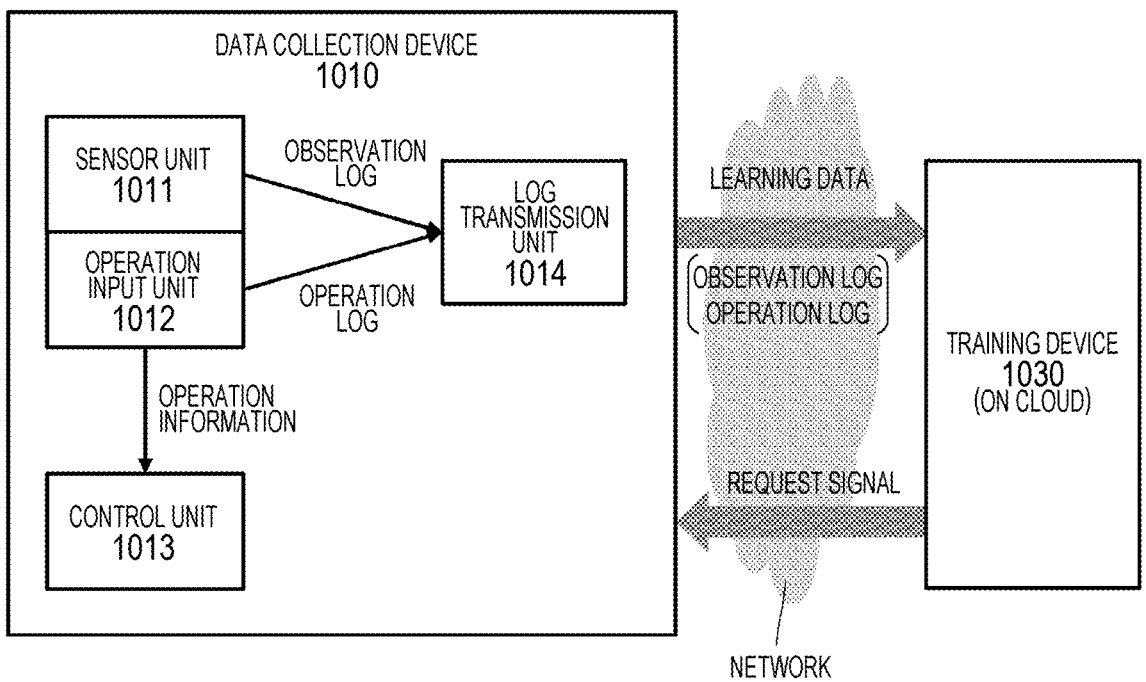
FIG. 18 is a diagram illustrating another internal configuration example of the data collection device 1010.

FIG. 18 illustrates another internal configuration example of the data collection device 1010. The data collection device 1010 illustrated in FIG. 18 includes the sensor unit 1011, the operation input unit 1012, the control unit 1013, and the log transmission unit 1014. The main difference from the configuration example illustrated in FIG. 17 is that the data analysis unit 1015 is not provided. The data collection device 1010 illustrated in FIG. 18 does not analyze collected data, in other words, the data collection device 1010 transmits all the collected data to the training device 1030 regardless of whether or not the collected data is meaningful learning data for training and re-training of the neural network model.

H-5. Configuration of Training Device

Figure 19:
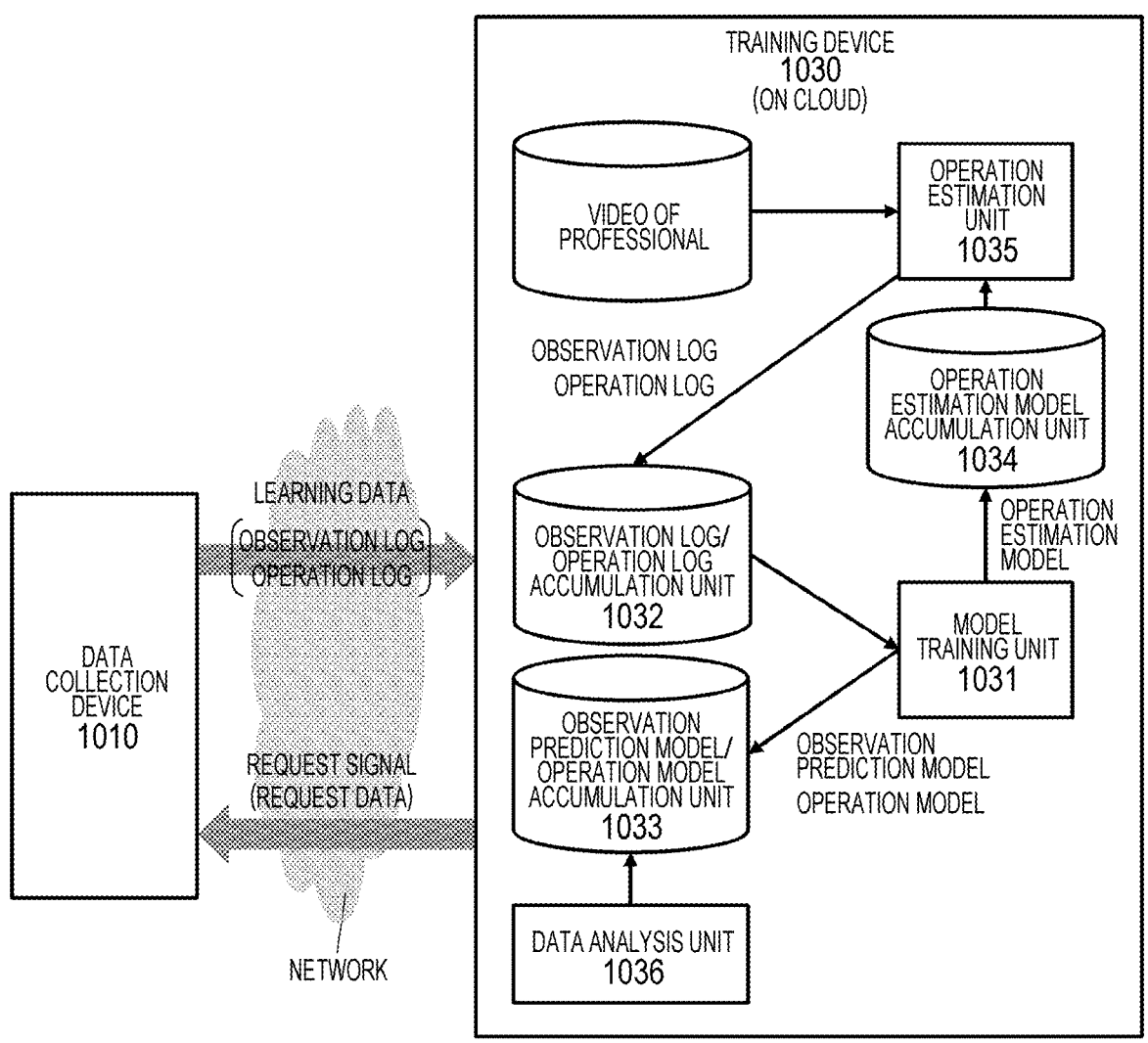
FIG. 19 is a diagram illustrating an internal configuration example of a training device 1030.

FIG. 19 illustrates an internal configuration example of the training device 1030. The training device 1030 illustrated in FIG. 19 includes a model training unit 1031, an observation/operation log accumulation unit 1032, an observation prediction model/operation model accumulation unit 1033, an operation estimation model accumulation unit 1034, an operation estimation unit 1035, and a data analysis unit 1036.

The model training unit 1031 trains various neural network models by using the learning data. Specifically, the model training unit 1031 performs training of the observation prediction model (see FIG. 11), the operation model (see FIG. 12), the operation estimation model (see FIG. 13), the impression score estimation model (see FIG. 14), and the like. In a case where the training device 1030 is cloud AI installed on the cloud, for example, the model training unit 1031 may be configured using a plurality of calculation nodes to perform distributed training of the neural network model.

The observation/operation log accumulation unit 1032 accumulates the observation log and the operation log transmitted from the data collection device 1010. It is assumed that the observation log and the operation log that are meaningful learning data are transmitted from the data collection device 1010.

The model training unit 1031 trains the observation prediction model on the basis of a data set including the observation log and the operation log accumulated in the observation/operation log accumulation unit 1032. Then, the trained observation prediction model is accumulated in the observation prediction model/operation model accumulation unit 1033.

In addition, the model training unit 1031 trains the operation model on the basis of a data set including the observation log and the operation log accumulated in the observation/operation log accumulation unit 1032. Then, the trained operation model is accumulated in the observation prediction model/operation model accumulation unit 1033.

In addition, the model training unit 1031 trains the operation estimation model on the basis of a data set including the observation log and the operation log accumulated in the observation/operation log accumulation unit 1032. Then, the trained operation estimation model is accumulated in the operation estimation model accumulation unit 1034.

The data analysis unit 1036 corresponds to the data analysis device 1040 in FIG. 10. The data analysis unit 1036 analyzes learning data that affects the training of each trained neural network accumulated in the observation prediction model/operation model accumulation unit 1033 and the operation estimation model accumulation unit 1034. Then, a request signal for requesting transmission of learning data that affects the training to a predetermined degree or more, insufficient learning data, or data similar thereto is transmitted from the training device 1030 to the data collection device 1010 on the basis of the analysis result. Therefore, the observation log and the operation log that are meaningful learning data are transmitted from the data collection device 1010. The data analysis unit 1036 analyzes the learning data on the basis of a method such as XAI, confidence score calculation, the influence function, or a Bayesian DNN, for example.

The operation estimation unit 1035 estimates time-series operation information for capturing a video captured by an expert familiar with camera operation such as a professional photographer (hereinafter, also referred to as a "video of a professional") on the basis of the video by using the trained operation estimation model. Then, a data set including the video of a professional (observation log) input to the operation estimation unit 1035 and the operation information (estimated operation log) estimated by the operation estimation unit 1035 is accumulated in the observation/operation log accumulation unit 1032 as high-quality learning data for training the operation model comparable to a professional. Therefore, the model training unit 1031 can train the operation model to be able to predict a camera operation comparable to a professional by using the high-quality learning data accumulated in the observation/operation log accumulation unit 1032.

Note that the video content of a professional is arbitrary, and is assumed to be provided to the cloud via the network. As a large amount of high-quality learning data is collected using a video content of a professional, it is possible to train the operation model for implementing automatic operation of the camera on a professional level.

Figure 20:
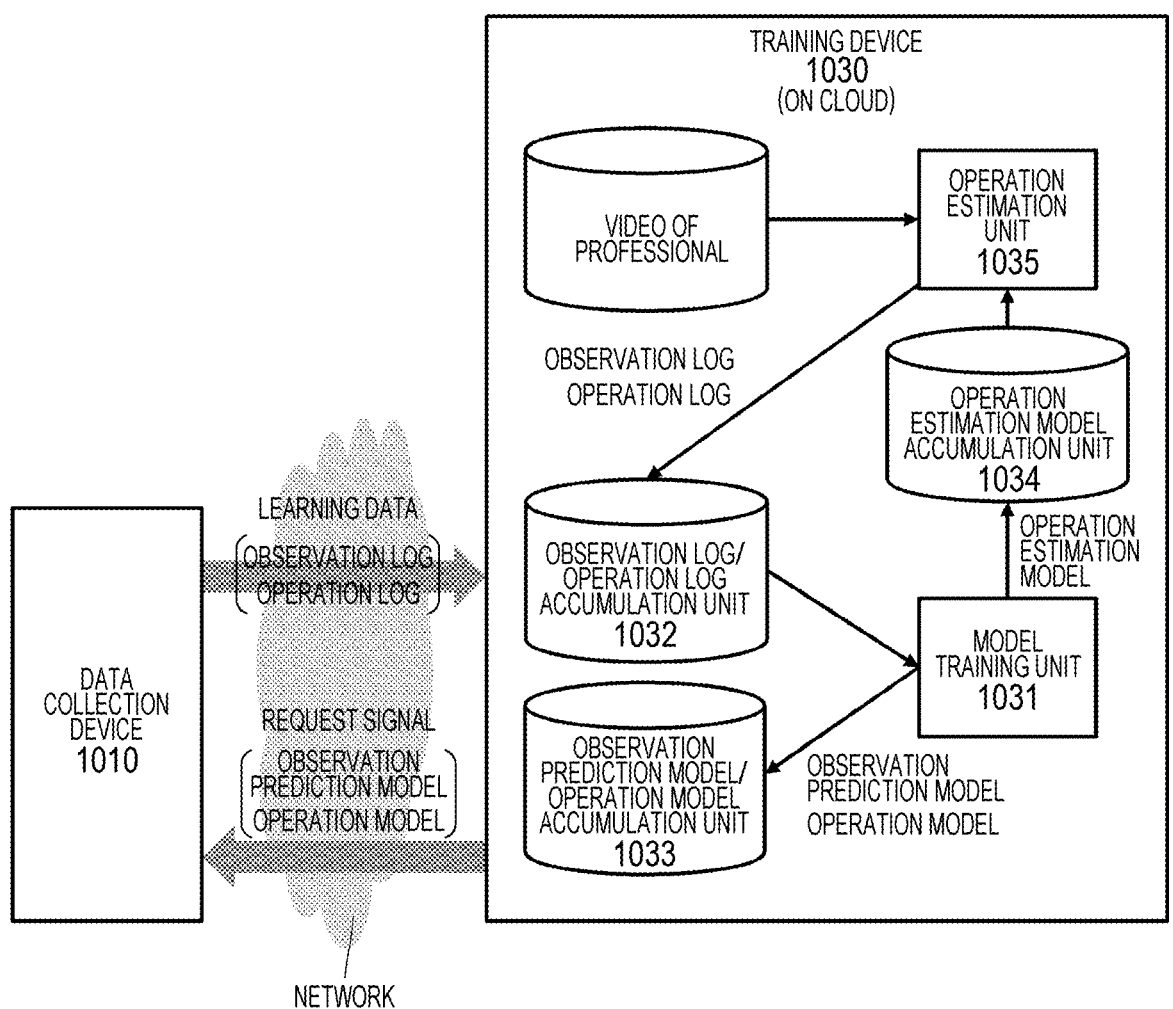
FIG. 20 is a diagram illustrating another internal configuration example of the training device 1030.

FIG. 20 illustrates another internal configuration example of the training device 1030. The training device 1030 illustrated in FIG. 20 includes the model training unit 1031, the observation/operation log accumulation unit 1032, the observation prediction model/operation model accumulation unit 1033, the operation estimation model accumulation unit 1034, and the operation estimation unit 1035. The main difference from the configuration example illustrated in FIG. 19 is that the data analysis unit 1036 is not provided.

The training device 1030 illustrated in FIG. 20 does not analyze the learning data by itself, but transmits information of a neural network model to be trained to the data collection device 1010 instead. In this case, on the data collection device 1010 side, the data analysis unit 1015 analyzes learning data that affects training of the neural network model to be trained in the training device 1030, and checks whether or not the data set including the observation log of the sensor unit 1011 and the operation log input to the operation input unit 1012 corresponds to meaningful learning data such as learning data that affects training of the neural network model to a predetermined degree or more, insufficient learning data, or data similar thereto (as described above). Then, only a data set that is meaningful learning data is transmitted from the data collection device 1010 to the training device 1030.

Figure 21:
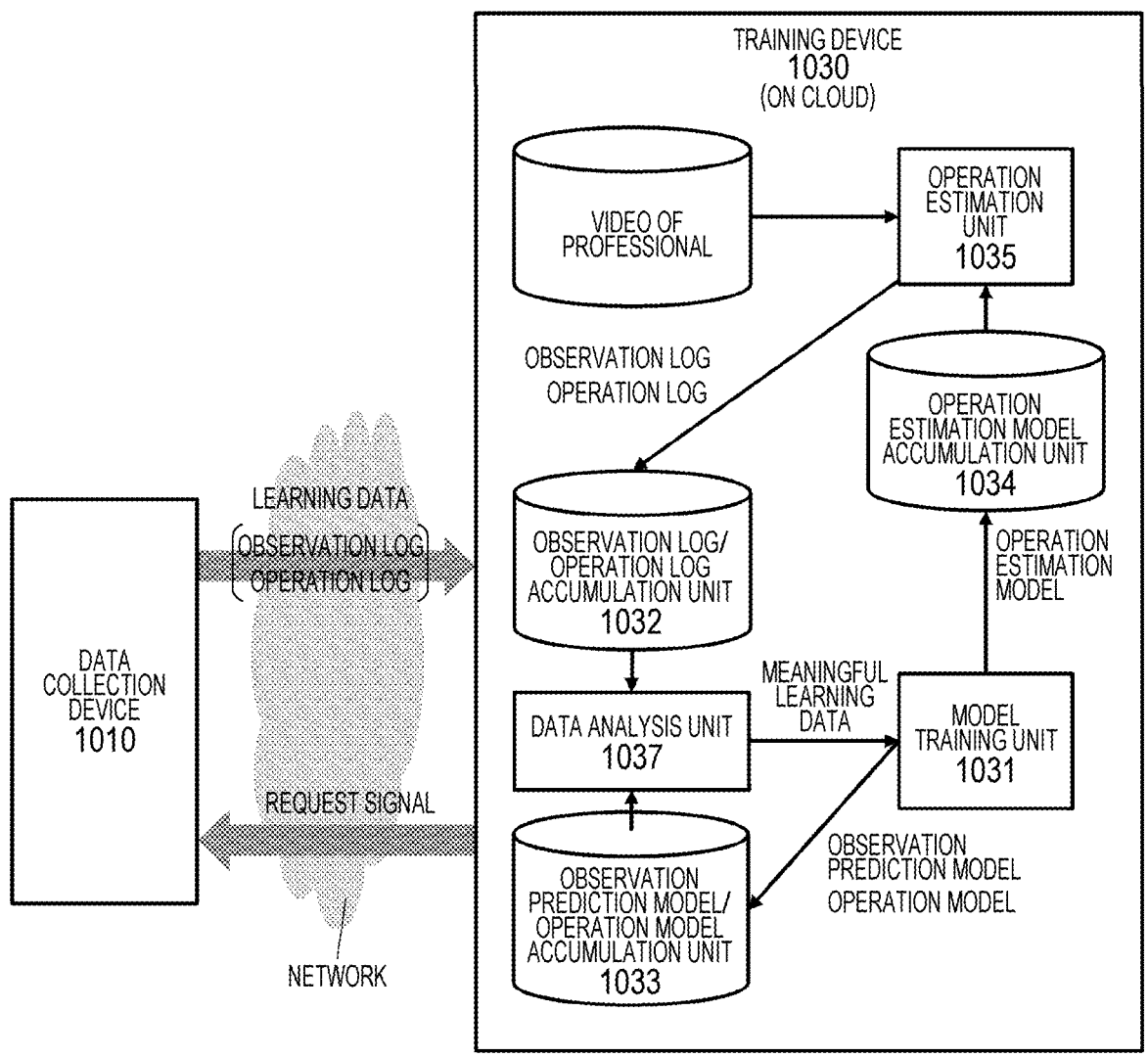
FIG. 21 is a diagram illustrating still another internal configuration example of the training device 1030.

FIG. 21 illustrates still another internal configuration example of the training device 1030. The training device 1030 illustrated in FIG. 21 includes the model training unit 1031, the observation/operation log accumulation unit 1032, the observation prediction model/operation model accumulation unit 1033, the operation estimation model accumulation unit 1034, the operation estimation unit 1035, and a data analysis unit 1037. The main difference from the configuration examples illustrated in FIGS. 19 and 20 is that the training device 1030 receives all pieces of collected data from the data collection device 1010 having the configuration example illustrated in FIG. 18 and checks whether or not each piece of received data is meaningful learning data in the data analysis unit 1037.

The data analysis unit 1037 corresponds to the data analysis device 1040 in FIG. 10. The data analysis unit 1037 analyzes an influence of each piece of received data accumulated in the observation/operation log accumulation unit 1032 on the training of each trained neural network accumulated in the observation prediction model/operation model accumulation unit 1033 and the operation estimation model accumulation unit 1034. Then, the data analysis unit 1037 extracts only meaningful learning data such as learning data that affects the training of each neural network model to a predetermined degree or more, insufficient learning data, or data similar thereto from the observation/operation log accumulation unit 1032 and outputs the extracted learning data to the model training unit 1031. Therefore, the model training unit 1031 can efficiently perform training and re-training of various neural network models by using meaningful learning data.

H-6. Configuration of Model Usage Device

Figure 22:
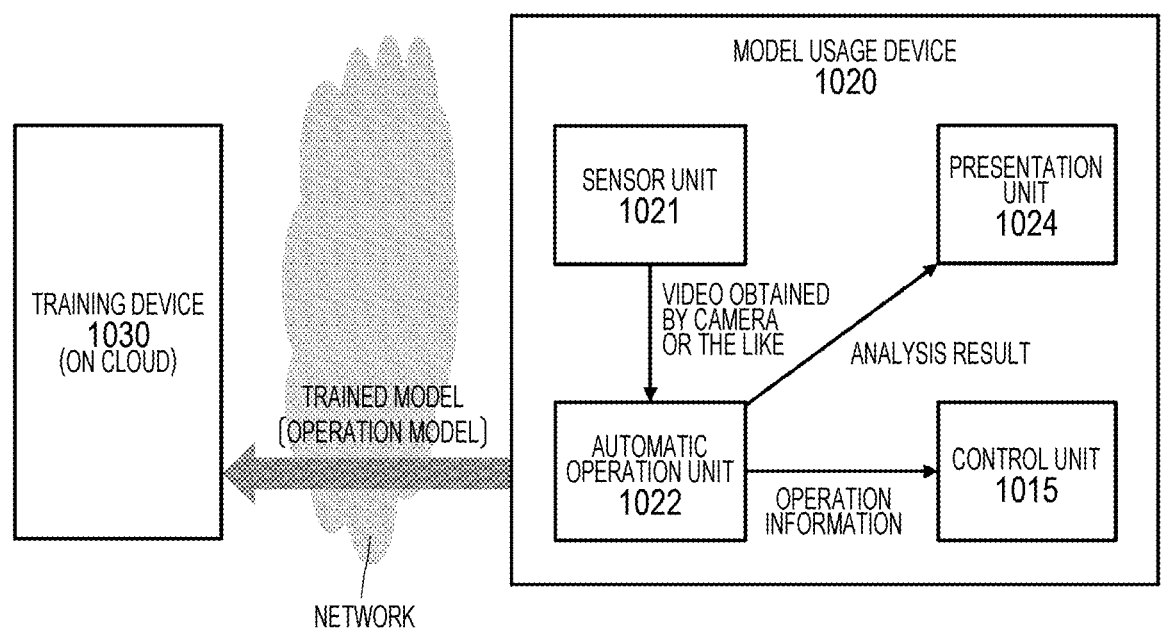
FIG. 22 is a diagram illustrating an internal configuration example of a model usage device 1020.

FIG. 22 illustrates an internal configuration example of the model usage device 1020. The model usage device 1020 includes a sensor unit 1021, an automatic operation unit 1022, a control unit 1023, and a presentation unit 1024.

The sensor unit 1021 includes an image sensor including a CMOS or the like and other sensors provided in the model usage device 1020, and performs observation including capturing of images and videos. In addition, in a case where the model usage device 1020 is mounted on a mobile device such as a robot or a drone, various sensors mounted on the mobile device such as an IMU are also included in the sensor unit 1021.

The automatic operation unit 1022 predicts operation information at the next time point on the basis of observation information (video information up to the current time point and operation information up to the current time point) of the sensor unit 1021 by using the operation model provided from the training device 1030, and outputs a data analysis result such as a confidence score of the predicted operation information.

The control unit 1023 controls observation in which an image or a video is captured in the sensor unit 1011 on the basis of the operation information at the next time point predicted by the automatic operation unit 1022.

In a case where the operation model that is sufficiently trained by the training device 1030 is provided, even a user of the model usage device 1020 who is not familiar with the camera operation can perform imaging comparable to that of an expert who is familiar with the camera operation, such as a professional photographer, on the basis of the operation information predicted by the automatic operation unit 1022.

The presentation unit 1024 presents a data analysis result such as the confidence score of the operation information predicted by the automatic operation unit 1022. The user of the model usage device 1020 can determine, on the basis of the presented confidence score, whether or not capturing of a video is performed on a professional level by the automatic operation.

H-7. Configuration of Edge AI

Figure 23:
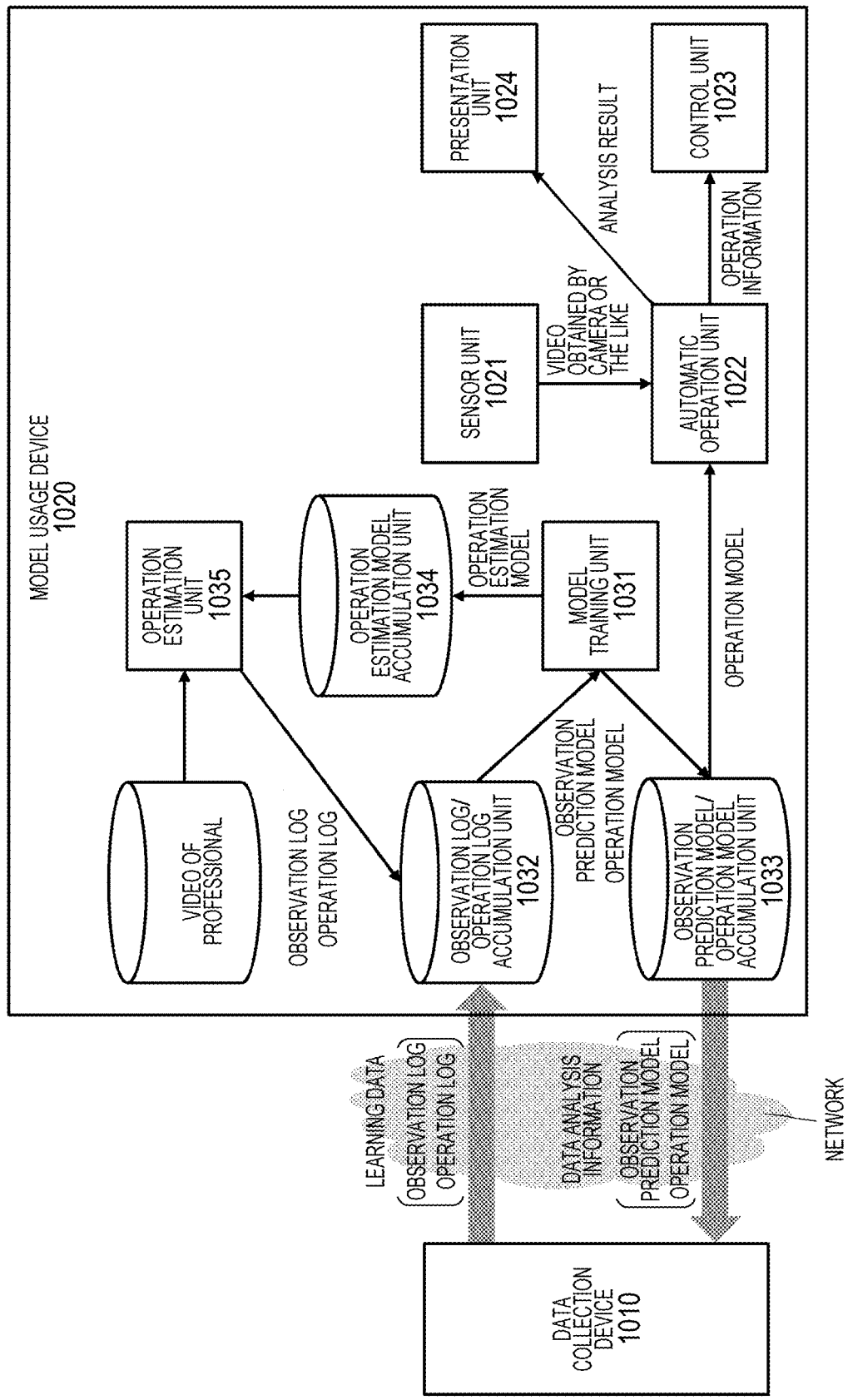
FIG. 23 is a diagram illustrating an internal configuration example of the model usage device 1020 as edge artificial intelligence (AI).

It is also assumed that the model usage device 1020 using the trained neural network model is configured integrally with the function of the training device that trains the neural network model (that is, the edge AI). FIG. 23 illustrates an internal configuration example of the model usage device 1020 as the edge AI. The illustrated model usage device 1020 includes the model training unit 1031, the observation/operation log accumulation unit 1032, the observation prediction model/operation model accumulation unit 1033, the operation estimation model accumulation unit 1034, and the operation estimation unit 1035 in addition to the sensor unit 1021, the automatic operation unit 1022, the control unit 1023, and the presentation unit 1024.

The observation/operation log accumulation unit 1032 accumulates the observation log and the operation log transmitted from the data collection device 1010. The model training unit 1031 trains the observation prediction model on the basis of a data set including the observation log and the operation log accumulated in the observation/operation log accumulation unit 1032. In addition, the model training unit 1031 trains the operation model on the basis of a data set including the observation log and the operation log accumulated in the observation/operation log accumulation unit 1032. Then, the trained observation prediction model and operation model are accumulated in the observation prediction model/operation model accumulation unit 1033.

In addition, the model training unit 1031 trains the operation estimation model on the basis of a data set including the observation log and the operation log accumulated in the observation/operation log accumulation unit 1032. Then, the trained operation estimation model is accumulated in the operation estimation model accumulation unit 1034. The operation estimation unit 1035 estimates time-series operation information for capturing a video captured by an expert who is familiar with camera operation such as a professional photographer on the basis of the video by using the trained operation estimation model, and accumulates the estimated time-series operation information in the observation/operation log accumulation unit 1032 as high-quality learning data for training the operation model comparable to a professional. Therefore, the model training unit 1031 can train the operation model to be able to predict a camera operation comparable to a professional by using the high-quality learning data accumulated in the observation/operation log accumulation unit 1032.

The sensor unit 1021 includes an image sensor including a CMOS or the like and other sensors provided in the model usage device 1020, and performs observation including capturing of images and videos.

The automatic operation unit 1022 predicts operation information at the next time point on the basis of observation information (video information up to the current time point and operation information up to the current time point) of the sensor unit 1021 by using the operation model read from the observation prediction model/operation model accumulation unit 1033, and outputs a data analysis result such as a confidence score of the predicted operation information.

The control unit 1023 controls observation in which an image or a video is captured in the sensor unit 1011 on the basis of the operation information at the next time point predicted by the automatic operation unit 1022. In a case where the operation model that is sufficiently trained by the training device 1030 is provided, even a user of the model usage device 1020 who is not familiar with the camera operation can perform imaging comparable to that of an expert who is familiar with the camera operation, such as a professional photographer, on the basis of the operation information predicted by the automatic operation unit 1022.

The presentation unit 1024 presents a data analysis result such as the confidence score of the operation information predicted by the automatic operation unit 1022. The model usage device 1020 can determine, on the basis of the presented confidence score, whether or not capturing of a video is performed on a professional level by the automatic operation.

INDUSTRIAL APPLICABILITY

Hereinabove, the present disclosure has been described in detail with reference to specific embodiments. However, it is obvious that those skilled in the art can make modifications and substitutions of the embodiments without departing from the scope of the present disclosure.

The present disclosure can be applied to data collection processing used for training of a machine learning model that generates a content that impresses people. The data collected on the basis of the present disclosure is used for learning data for training a machine learning model (for example, a neural network model) for handling a content that impresses people (specifically, for estimating a camera operation for generating an impressing content or capturing an impressing content), but it is a matter of course that the data can also be used for training machine learning models for other uses.

In addition, a machine learning model for identifying an emotion given to people by a content can be trained using the data collected on the basis of the present disclosure, and the emotion identifier including the machine learning model developed in this manner can be mounted on a content processing device such as a digital camera.

In short, the present disclosure has been described in the form of exemplification, and the contents described in the present specification should not be restrictively interpreted. The appended claims should be referred to in determining the gist of the present disclosure.

Note that the present disclosure can have the following configurations.

(1) A training system including: a data collection device that collects data; and a training device that performs training of a machine learning model by using the data collected by the data collection device, in which the training device performs re-training of the machine learning model by using learning data that affects the training of the machine learning model to a predetermined degree or more, insufficient learning data, or data similar thereto, collected on the basis of a result of analyzing learning data that affects the training of the machine learning model.

(2) The training system according to (1),
in which the training device performs training of a machine learning model that generates an impressing content or estimates a camera operation for capturing an impressing content.

(3) The training system according to (1) or (2),
in which the analysis is performed by explainable AI (XAI), confidence score calculation, an influence function, or a Bayesian deep neural network (DNN).

(4) The training system according to any one of (1) to (3),
in which the training device analyzes the learning data that affects the training of the machine learning model, and transmits, to the data collection device, a request signal for requesting transmission of the learning data that affects the training of the machine learning model to the predetermined degree or more, the insufficient learning data, or the data similar thereto on the basis of a result of the analysis,
the data collection device transmits, to the training device, data collected on the basis of the received request signal, and
the training device re-trains the machine learning model on the basis of the data transmitted from the data collection device in response to the request signal.

(5) The training system according to any one of (1) to (4),
in which the data collection device is a camera or an imager that captures an image, and transmits, to the training device, image data captured by changing a resolution, a frame rate, a luminance, a color, an angle of view, a viewpoint position, or a line-of-sight direction on the basis of a degree of influence on the training of the machine learning model.

(6) The training system according to any one of (1) to (3),
in which the training device transmits a request signal for requesting transmission of the learning data of the machine learning model to the data collection device,
the data collection device transmits, to the training device, the learning data that affects the training of the machine learning model to the predetermined degree or more, the insufficient learning data, or the data similar thereto among the collected data on the basis of a result of analyzing an influence of the collected data on the training of the machine learning model, and
the training device re-trains the machine learning model on the basis of the data transmitted from the data collection device in response to the request signal.

(7) The training system according to (6),
in which the training device transmits information necessary for the analysis to the data collection device when transmitting the request signal.

(8) A data collection device including:
a reception unit that receives a request signal for requesting transmission of learning data of a machine learning model from a training device that performs training of the machine learning model;
a data collection unit that collects learning data that affects the training of the machine learning model to a predetermined degree or more, insufficient learning data, or data similar thereto in response to the reception of the request signal; and
a transmission unit that transmits the data collected by the data collection unit to the training device.

(9) The data collection device according to (8),
in which the reception unit receives, from the training device, the request signal for requesting the learning data that affects the training of the machine learning model to the predetermined degree or more, the insufficient learning data, or the data similar thereto,
the data collection unit collects data on the basis of the received request signal, and
the transmission unit transmits the data collected by the data collection unit to the training device.

(10) The data collection device according to (9),
in which the data collection unit newly collects data on the basis of the received request signal, or the transmission unit transmits data extracted on the basis of the request signal from data already collected by the data collection unit.

(11) The data collection device according to (8), further including
an analysis unit that analyzes an influence of the data collected by the data collection unit on the training of the machine learning model,
in which the transmission unit transmits, to the training device, the learning data that affects the training of the machine learning model to the predetermined degree or more, the insufficient learning data, or the data similar thereto among the data collected by the data collection unit on the basis of a result of the analysis performed by the analysis unit.

(12) The data collection device according to any one of (8) to (11),
in which the data collection unit collects image data captured by changing a resolution, a frame rate, a luminance, a color, an angle of view, a viewpoint position, or a line-of-sight direction of a camera or an imager that captures an image on the basis of a degree of influence on the training of the machine learning model.

(13) An information processing device including:
a segment extraction unit that extracts a segment from a content on the basis of content evaluation information of the content and biological information of a person who views and listens the content;
a facial expression identification unit that detects a face of a person appearing in the segment and identifies a facial expression of the face;
a relationship estimation unit that estimates a relationship between persons appearing in the segment; and
an impression identification unit that identifies an impression label of the segment on the basis of the facial expression of the face of the person appearing in the segment and the relationship between the persons.

(14) The information processing device according to (13),
in which the biological information includes at least brain wave information.

(15) The information processing device according to (13) or (14),
in which the segment extraction unit extracts, from the content, a segment in which a high evaluation and biological information accompanying a positive emotion match.

(16) The information processing device according to (15),
in which the segment extraction unit further extracts a segment in which a high evaluation and biological information accompanying a positive emotion do not match.

(17) The information processing device according to any one of (13) to (16),
   in which the relationship estimation unit estimates the relationship between the persons appearing the segment on the basis of a context with preceding and following segments and facial expressions of faces of the persons.

(18) The information processing device according to (17),
   in which the relationship estimation unit estimates, as the context, a relationship between persons appearing in a current segment by using a result of detecting faces of the persons appearing in a past segment and identifying facial expressions of the detected faces.

(19) The information processing device according to any one of (13) to (18), further including
   a first emotion analysis unit that analyzes an emotion on the basis of text information obtained by recognizing a speech included in the segment,
   in which the impression identification unit identifies the impression label of the segment in further consideration of the emotion identified from the text information by the first emotion analysis unit.

(20) The information processing device according to any one of (13) to (19), further including
   a second emotion analysis unit that detects music included in the segment and analyzes an emotion given by the music,
   in which the impression identification unit identifies the impression label of the segment in further consideration of the emotion identified from the music by the second emotion analysis unit.

(21) An information processing method including:
   a segment extraction step of extracting a segment from a content on the basis of content evaluation information of the content and biological information of a person who views and listens the content;
   a facial expression identification step of detecting a face of a person appearing in the segment and identifying a facial expression of the face;
   a relationship estimation step of estimating a relationship between persons appearing in the segment; and
   an impression identification step of identifying an impression label of the segment on the basis of the facial expression of the face of the person appearing in the segment and the relationship between the persons.

(22) A computer program described in a computer-readable form to cause a computer to function as:
   a segment extraction unit that extracts a segment from a content on the basis of content evaluation information of the content and biological information of a person who views and listens the content;
   a facial expression identification unit that detects a face of a person appearing in the segment and identifies a facial expression of the face;
   a relationship estimation unit that estimates a relationship between persons appearing in the segment; and
   an impression identification unit that identifies an impression label of the segment on the basis of the facial expression of the face of the person appearing in the segment and the relationship between the persons.

(23) A method of generating a trained machine learning model that identifies an impression given by a content, the method including:
   a step of inputting a content into a machine learning model;
   a step of obtaining a video feature estimated from the content by the machine learning model;
   a step of acquiring an audio feature estimated from the content by the machine learning model;
   a step of acquiring a text feature of a speech estimated from the content by the machine learning model;
   a step of identifying an impression label of the content on the basis of the video feature, the audio feature, and the text feature estimated by the machine learning model;
   a step of calculating a loss function based on an error between the identified impression label and an impression label assigned to the content; and
   a step of updating a parameter of the machine learning model on the basis of the loss function.

(24) The method of generating a trained machine learning model according to (23),
   in which the video feature includes a relationship between persons estimated on the basis of a context of a plurality of consecutive frames in a case where there are two or more persons in a frame of a video.

REFERENCE SIGNS LIST

100 Data collection system
101 Video content
102 Content evaluation information acquisition unit
103 Biological information acquisition unit
104 Comparison unit
105 Segment extraction unit
106 Context extraction unit
107 Speech recognition unit
108 Music detection unit
109 Face detection unit
110 First emotion analysis unit
111 Second emotion analysis unit
112 Facial expression identification unit
113 Relationship estimation unit
114 Impression identification unit
410 Data accumulation unit
420 Impression identifier
421 Network unit
422 Identification unit
423 Evaluation unit
500 Digital camera
501 Optical system
502 Imaging unit
503 AFE unit
504 Camera signal processing unit
506 Main processing unit
514 Microphone
515 A/D conversion unit
516 Display unit
517 Sound reproducing unit
518 Recording unit
1000 Training system
1010 Data collection device
1011 Sensor unit
1012 Operation input unit
1013 Control unit
1014 Log transmission unit
1015 Data analysis unit
1020 Model usage device
1021 Sensor unit
1022 Automatic operation unit
1023 Control unit
1024 Presentation unit
1030 Training device
1031 Model training unit
1032 Observation/operation log accumulation unit 1033 Observation prediction model/operation model accumulation unit
1034 Operation estimation model accumulation unit
1035 Operation estimation unit
1036 Data analysis unit
1037 Data analysis unit
1040 Data analysis device
1100 Observation prediction model
1200 Operation model
1300 Operation estimation model
1400 Impression score estimation model

The invention claimed is:

1. A training system, comprising:
   a data collection device configured to collect learning data; and
   a training device configured to:
   execute a training operation of a machine learning model, based on the collected learning data;
   analyse the collected learning data that affects the training operation of the machine learning model; and
   execute a re-training operation of the machine learning model, based on specific learning data, wherein
   the specific learning data includes one of
   learning data that affects the training operation of the machine learning model to more than a specific degree, or
   insufficient learning data, and
   the specific learning data is collected based on a result of the analysis of the collected learning data that affects the training operation of the machine learning model.

2. The training system according to claim 1, wherein the machine learning model:
   generates impressing content, or
   estimates a camera operation for capture of the impressing content.

3. The training system according to claim 1, wherein the analysis is based on one of
   an explainable artificial intelligence (XAI),
   a confidence score calculation,
   an influence function, or
   a Bayesian deep neural network (DNN).

4. The training system according to claim 1, wherein the training device is further configured to
   transmit, to the data collection device, a request signal to request for the one of
   the learning data that affects the training operation of the machine learning model to more than the specific degree, or
   the insufficient learning data,
   the data collection device is further configured to transmit, based on the request signal, collected data to the training device, and
   the training device is further configured to execute the re-training operation of the machine learning model based on the collected data transmitted from the data collection device.

5. The training system according to claim 1, wherein
   the data collection device is one of a camera or an imager,
   the data collection device is configured to:
   capture an image, and
   transmit, to the training device, image data of the image captured by change in one of a resolution, a frame rate, a luminance, a color, an angle of view, a viewpoint position, or a line-of-sight direction of the one of the camera or the imager, wherein
   the one of the resolution, the frame rate, the luminance, the color, the angle of view, the viewpoint position, or the line-of-sight direction is changed based on a degree of influence on the training operation of the machine learning model.

6. The training system according to claim 1, wherein
   the training device is further configured to transmit a request signal to request for the specific learning data of the machine learning model to the data collection device,
   the data collection device is further configured to transmit, to the training device, the one of the learning data that affects the training operation of the machine learning model to more than the specific degree, or the insufficient learning data, and
   the training device is further configured to execute the re-training operation the machine learning model based on the transmitted the one of the learning data that affects the training operation of the machine learning model to more than the specific degree, or the insufficient learning data.

7. The training system according to claim 6, wherein the training device is further configured to transmit, based on the request signal, information necessary for the analysis to the data collection device.

8. A data collection device, comprising:
   a processor configured to:
   receive, from a training device, a first request signal, wherein
   the first request signal requests for learning data of a machine learning model, and
   the training device executes a training operation of the machine learning model;
   analyse the learning data that affects the training operation of the machine learning model;
   collect specific learning data, based on a result of the analysis of the learning data that affects the training operation of the machine learning model, wherein
   the specific learning data includes one of
   learning data that affects the training operation of the machine learning model to more than a specific degree, or
   insufficient learning data; and
   control transmission of the collected specific learning data to the training device, wherein the training device executes a re-training operation of the machine learning model based on the specific learning data.

9. The data collection device according to claim 8, wherein the processor is further configured to:
   receive, from the training device, a second request signal, wherein the second request signal requests for the specific learning data; and
   collect the specific learning data based on the received second request signal.

10. The data collection device according to claim 8, wherein
    the processor is further configured to collect image data captured by change in one of a resolution, a frame rate, a luminance, a color, an angle of view, a viewpoint position, or a line-of-sight direction of one of a camera or an imager that captures an image, and
    the image is captured based on a degree of influence on the training operation of the machine learning model.

* * * * *